United States Patent [19]

Gunny

[11] Patent Number: 4,710,774

[45] Date of Patent: Dec. 1, 1987

[54] AIRCRAFT COLLISION AVOIDANCE SYSTEM

[76] Inventor: Edmond R. Gunny, 7612 Alverstone Ave., Los Angeles, Calif. 90045

[21] Appl. No.: 830,629

[22] Filed: Feb. 18, 1986

[51] Int. Cl.$^4$ .............................................. G01S 3/02
[52] U.S. Cl. ..................................... 342/455; 342/88; 342/29; 364/461
[58] Field of Search .................. 342/455, 88, 29, 454; 364/460, 461

[56] References Cited

U.S. PATENT DOCUMENTS

| | | |
|---|---|---|
| 2,606,317 | 8/1952 | Wallace .............................. 342/455 |
| 3,025,521 | 3/1962 | Tatel et al. ......................... 342/455 |
| 3,071,767 | 1/1963 | Freedman ........................... 342/455 |
| 3,159,832 | 12/1964 | Cox, Jr. ............................. 342/29 |
| 3,183,504 | 5/1965 | Graham .............................. 342/88 |
| 3,208,064 | 9/1965 | Morrel ................................ 342/88 |
| 3,217,321 | 11/1965 | Cox, Jr. ............................. 342/88 |
| 3,255,900 | 6/1966 | Graham .............................. 342/88 |
| 3,560,991 | 2/1971 | Beigel, Jr. et al. ................... 342/88 |
| 3,564,544 | 2/1971 | Scott et al. ......................... 342/88 |
| 3,564,545 | 2/1971 | Gottlieb et al. ..................... 342/88 |
| 3,803,608 | 4/1974 | Breckman . |
| 3,887,916 | 6/1975 | Goyer . |
| 3,893,112 | 7/1975 | Miller . |
| 3,913,100 | 10/1975 | Janex . |
| 3,940,764 | 2/1976 | Beeswing . |
| 3,947,845 | 3/1976 | Lyon . |
| 4,003,050 | 1/1977 | Miller . |
| 4,059,806 | 11/1977 | Vagt, Jr. . |
| 4,167,006 | 9/1979 | Funatsu et al. . |
| 4,194,201 | 3/1980 | Stein . |
| 4,357,634 | 11/1982 | Chung . |
| 4,380,050 | 4/1983 | Tanner ............................... 364/461 |

Primary Examiner—Theodore M. Blum
Assistant Examiner—David Cain
Attorney, Agent, or Firm—Henry M. Bissell

[57] ABSTRACT

A communication system particularly adapted for use in an aircraft collision avoidance system wherein the transmitted portions of messages exchanged between aircraft consist of pulses or pairs of pulses at the beginning and end of a message. The data or information content of a message is defined by the time duration between start and end pulses, an interval during which the sender's transmitter is off. Thus the media is clear for other aircraft to use during the major portion of any message, thereby greatly increasing the number of aircraft which can be accommodated by the system without overloading the communication medium. The system provides for determining the presence of other aircraft in the near vicinity which may be a collision threat and for sending intent messages to threat aircraft to assist in collision avoidance.

39 Claims, 14 Drawing Figures

DATA MESSAGE
TIMING DIAGRAM

INTERROGATION MESSAGE GENERATOR

MESSAGE TYPE DECODER

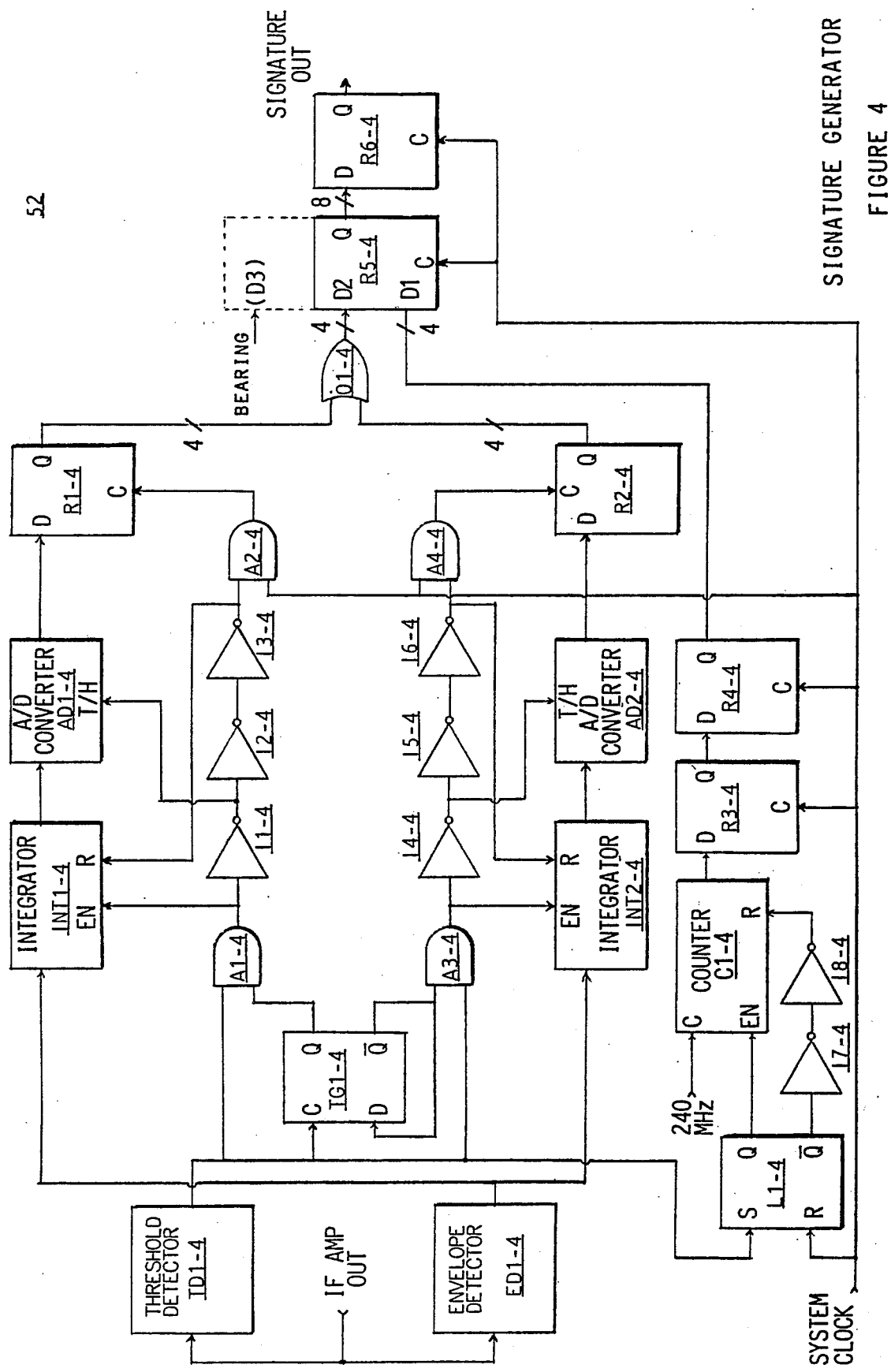
FIGURE 4 SIGNATURE GENERATOR

INTERROGATION DECODER

INTERROGATION DECODER

REPLY ENCODER

REPLY DECODER

REPLY DECODER

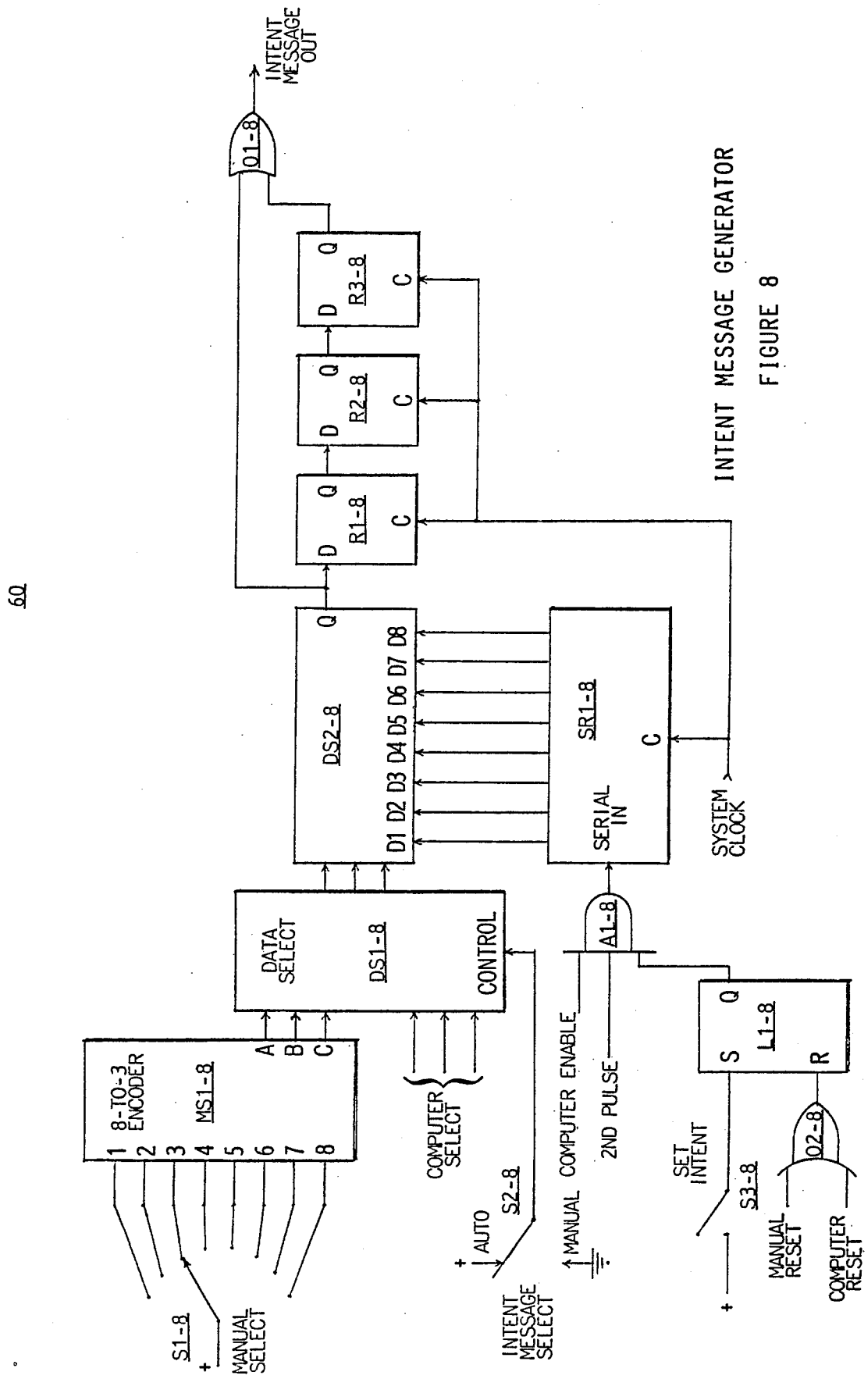

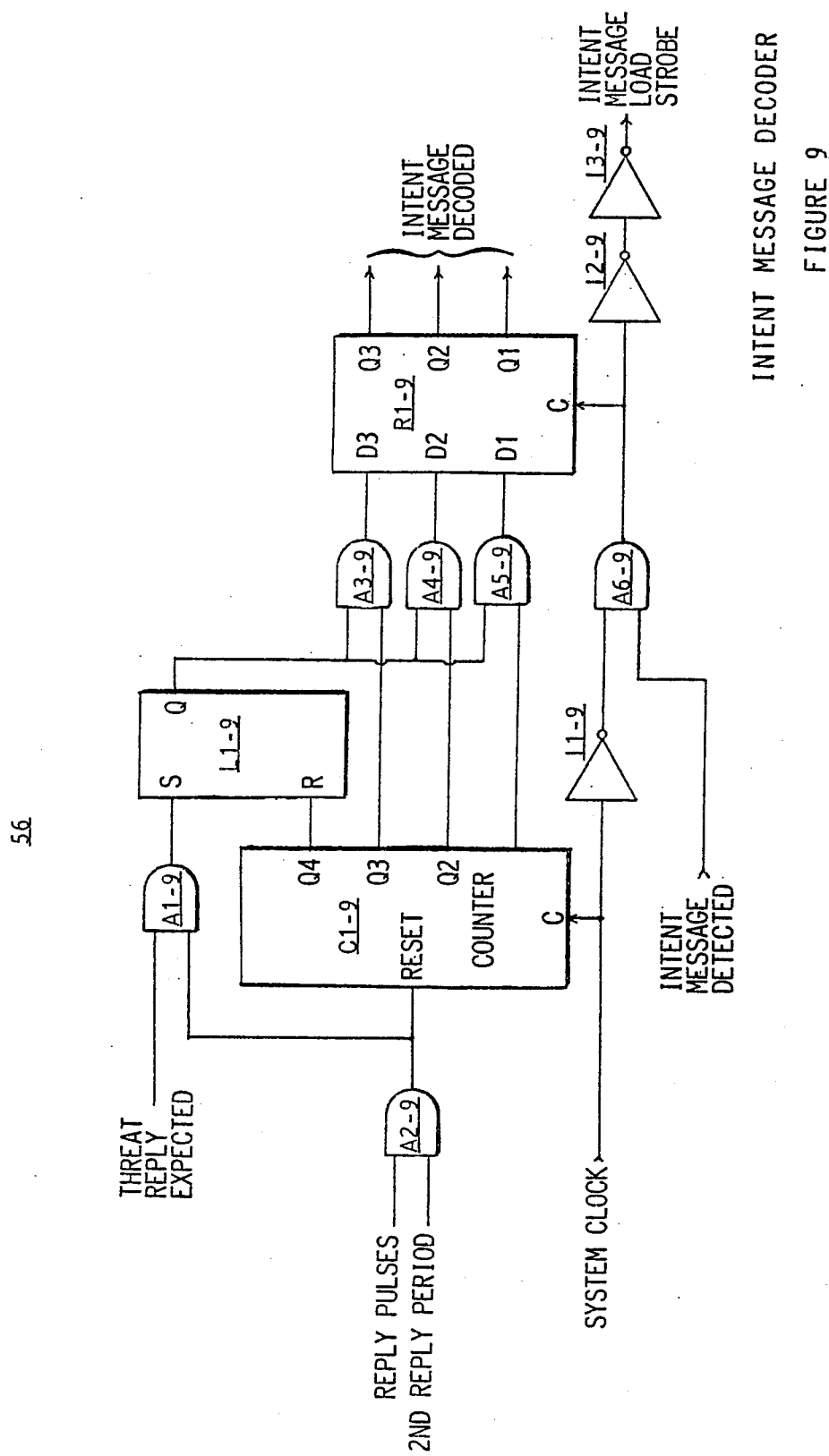

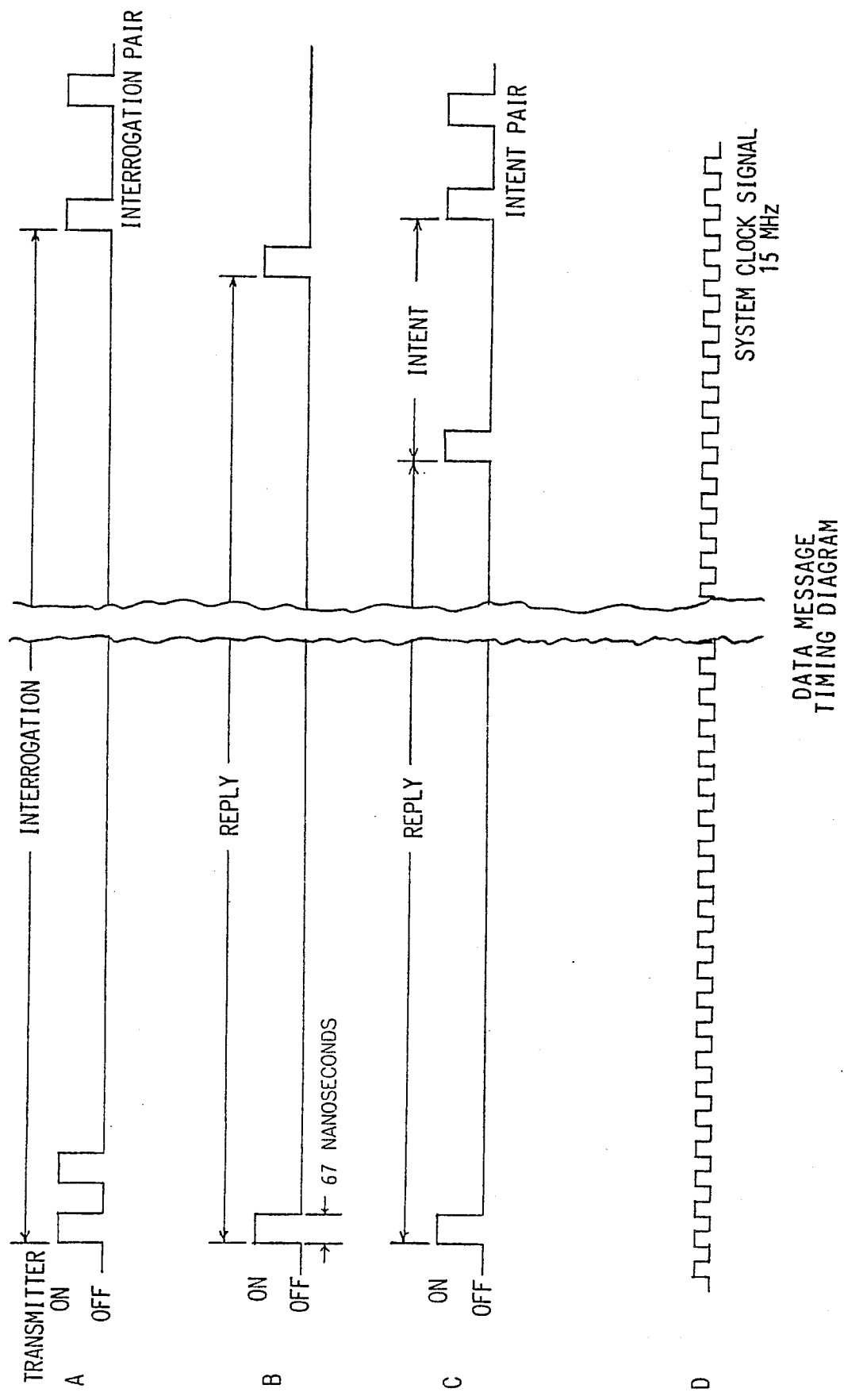

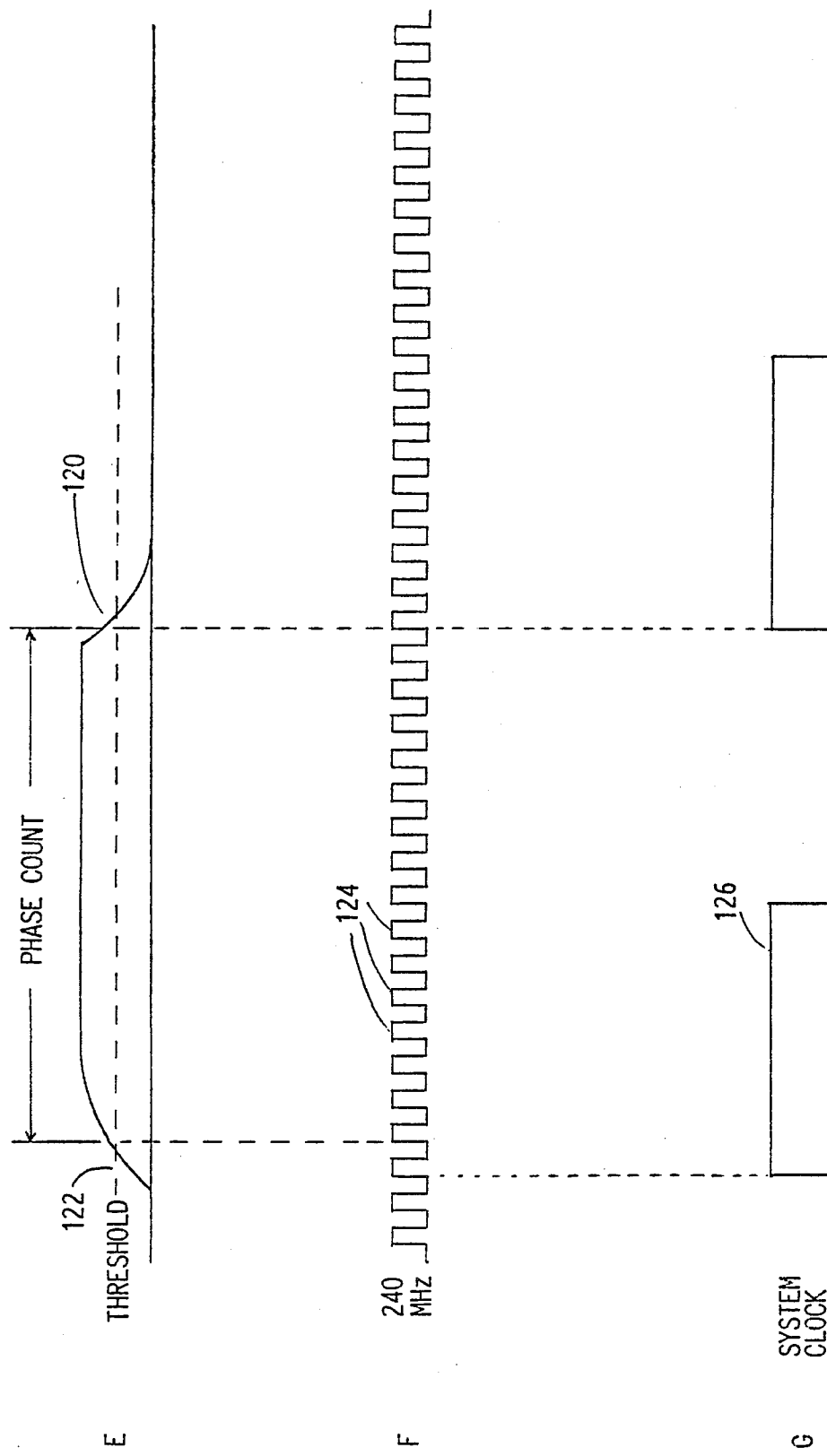

AIRCRAFT COLLISION AVOIDANCE SYSTEM

BACKGROUND OF THE INVENTION

1. Field of the Invention.

This invention relates to aircraft collision avoidance systems and, more particularly, to such systems utilizing digitial data links and associated equipment for detecting and signifying the presence of other aircraft within a predetermined range which are on a collision path with an interrogating aircraft.

2. Description of the Prior Art.

Considerable effort has been applied by numerous researchers over a substantial period of time in attempts to develop a satisfactory collision avoidance system for aircraft. The only systems presently under consideration by the FAA are referred to as Traffic Alert and Collision Avoidance Systems (TCAS). They are said to surround an aircraft having such a system installed with an invisible "radar shield". While present TCAS systems have evolved from a program initiated nearly 30 years ago by the Air Transport Association of America (ATA) on behalf of its member airlines, and although the Federal Aviation Administration (FAA) has been conducting flight tests of current versions of TCAS, the FAA has yet to issue any directives indicating approval of such systems as are available.

Such recent developments have been reported in articles entitled "Preventing Midair Collisions" by Ken Julian, HIGH TECHNOLOGY, July 1985, pages 48–53, and "Enhanced Collision Avoidance System Cuts Unneeded Alerts" by Phillip J. Klass, AVIATION WEEK & SPACE TECHNOLOGY, May 20, 1985, pages 120–125. While describing some of the features of these systems, these articles also indicate some of the drawbacks and disadvantages which may perhaps account for the evident reluctance of the FAA to settle on one particular type of system and mandate its adoption by the Aviation Industry.

Among the drawbacks of the systems reported are the substantial cost of a given installation, which militates against its widespread use by General Aviation types of aircraft, and the susceptibility of the systems to overloading from saturation when substantial air traffic is present. While the articles report beneficial results in reducing the number of unnecessay alerts (false alarms), the fact that false alarms and missed alarms, at whatever low level, may be acceptable does not accord with good system design principles.

Moreover it is clear that the quest for a satisfactory collision avoidance system which is suitable for small aircraft is still underway. That the FAA's TCAS is not an acceptable answer as this nation's standard system is evidenced by the FAA's work on its replacement, called Mode-S. That Mode-S is not acceptable has been established by an assessment made by the Rand Corporation. As the results of a study made by Rand on DABS (the earlier name for Mode-S), findings were that DABS may work so long as the number of communicating aircraft does not exceed 25. The FAA provides a worst-case traffic environment as being a peak condition in the LAX basin area in 1995. Here, there may be as many as 1105 aircraft simultaneously airborne (FAA-RD-81-39). Thus, a number like 25 is woefully low. Add to this the work by the Lincoln Laboratory staff showing that surface-reflected signals by lengthy transmissions are themselves a source of destructive interference and the need for an alternative solution is clear.

Until there is a design suitable for use by all and able to provide reliability when subjected to worst-case traffic scenarios, the search will continue. This invention purports to be a solution as a means of establishing a reliable data link between multi-station nets wherein the numbers of communicating stations (aircraft) are high and the conveying media is other than wire—a solution that could well be the basis for an acceptable National Standard for an Aircraft Collision-Avoidance System.

SUMMARY OF THE INVENTION

Although the present invention will be disclosed in the context of an aircraft collision avoidance system, it will be understood that certain principles in accordance with the present invention may have application in other fields. Generally speaking, the principle of the present invention are directed to maximizing the communications data-link reliability for data links between stations utilizing other than wired data links. Communications links which are referred to herein involve such types of data links.

In any multi-station communications link where the conveying media is not wire, a problem exists. There is no way for a transmitting station to lock-out transmissions by other stations until its transmissions have reached all other stations. Thus, at a receiving station there is the probability that two, or more, signals may be received together. If the intelligence is encoded digitally, any overlap of two signals at a receiving station will alter the contents of both signals, rendering them virtually useless. In order to maximize the reliability of transmissions in the face of this type of interference, two limits must be sought. One, the number of transmissions each station makes, within a data exchange period, should be kept to a minimum. Secondly, the transmitter-on times of those transmissions should also be kept to a minimum while exchanging requisite intelligence.

It is a general object of this invention to establish a signal-carrier modulation means wherein messages able to convey the magnitudes of several parameters can all be comprised of just two transmitted RF pulses each having a minimum time length. The minimum transmission pulse time is a time established by the spectrum available for usage. This pulse time is referred to herein as a unit time length. The single time period between the start times of two pulses making up a message represents all of the encoded intelligence. It is obvious that a time period can be used to scale the magnitude of one parameter of interest. It is not obvious that a single time period existing between two transmissions of a sending station can be used to scale the magnitudes of several parameters of interest. Also once a means is established to detect pairs of pulses emanating from a sending station and then decode the message, it is not obvious how one receiving station can continually detect transmissions from a plurality of sending stations resulting in overlapping pulse-pairs, then be able to separate and identify pairs of pulses from each sending station. Also, while it is obvious that any station can respond to inquiries and send a reply message consisting of two uniquely time spaced pulses, it is not obvious how any station can respond to a plurality of inquiries and send different messages to each that require pairs of transmissions that may overlap timewise.

It is therefore an object of this invention to show how the time between two transmitted radio pulse signals can be used as an intermediate parameter, one which is able to convey almost any desired message with a minimum of transmitter-on time. It is a further objective of this invention to show how this transmission-time efficient signal carrier modulation means can be implemented, to operate reliably in an environment where there may be communicatiing stations that number in excess of 1000.

In the particular application wherein the communicating stations may be either aircraft, or Air Traffic Control stations, the data needed to be exchanged is that of inter-station range, relative bearing, altitude, aircraft (or station) type, present flight intent (for aircraft), and an address included as part of all 'reply' type messages. Here, the term 'aircraft type' refers to the station's horizontal and vertical speed capability. Including it in a data exchange provides a means of reducing the otherwise generated numbers of transmissions. Just how will be explained later in this disclosure.

Present technology limits practical operation to co-operative type systems of communication. Typically, asynchronous communications take place by the well known technique of having each station periodically transmitting interrogation-type messages. These interrogations are to solicit replies from all other stations within range, and within an altitude band of interest. Many other patents have been issued for such a station communicating arrangement. All suffer from the problem of unacceptable reliability when the numbers of stations are significant (greater than 25), and/or the time lengths of transmissions are so long that surface-reflected signals become, themselves, a source of destructive interference. What follows is a description of how the novel usage of inter-pulse time can provide high reliability communications in the application of an airborne traffic surveillance system that can include Air Traffic Control ground stations as special participants.

It is an object of this invention to use different units of time measurements to convey the magnitudes of several parameters of interest, then totalize these units to form a single time period between two transmitted signals as the makeup of the complete composite message. It is an object of this invention to show how multiple reply messages may be encoded even though they require overlapping periods of time. A further objective is to show how a signal receiving station can recover pairs of pulses amidst many time-overlapping pairs having different time spacings and coming from many diversely located sources, then decode the time interval between the detected pairs so as to recover the encoded intelligence.

In any threat alarm system, there is concern over the incidences of both false alarms that may be generated, and alarms that, for whatever reason, may be missed. Threats of possible collision between aircraft may be derived by examination of exchanged positional information. To minimize incidences of false and/or missed alarms it is a further feature of this exemplary design to exchange altitude-to-be-attained at some future time, rather than present altitude. Since, to be practical, any collision-avoidance system must provide a warning some time prior to a computed collision time, that warning can be more accurate if it is based upon knowledge of differential altitude that may exist at the computed collision time. For example, if it is desired to provide a warning lead time of 40 seconds, then that altitude to be exchanged is to be that altitude to be attained in the next 40 seconds. This can be implemented by summing present altitude information obtained from an encoding altimeter with a rate term obtained by differentiating, then scaling the altitude measured. This, it is to be understood that altitude to be encoded is that 'future' altitude to be reached in an established warning time period. In this example, it would be that altitude to be reached in the next 40 seconds.

While the concept of limiting all messages to just two minimum length transmissions represents the ultimate in minimizing message transmitter-on times, another objective is to minimize the numbers of transmissions that any station need make during a data-exchange period (epoch). In this example of inter-aircraft data exchange wherein each aircraft makes one interrogatory type transmission per epoch, replies need come only from those aircraft within an altitude band of interest about that of the interrogator. That altitude band is established by two factors. One, the warning lead time chosen to be used, and secondly, the vertical speed capability of the communicating aircraft. The Air Transport Association has established the goal of ±3400 feet as being the altitude band of interest for Air Carrier type aircraft. This is based upon the average vertical speed capability, and a lead warning time of 40 seconds. The majority of aircraft in any population near terminal areas will be of the general avaiation category. They don't have as great a vertical speed capability, hence need not communicate over as wide an altitude band. It is an object of this invention to include in the inter aircraft communications an indication of the type of aircraft transmitting the received signal. Where two Air Carrier types should communicate so long as their differential altitude is less than 3400 feet, two general avaiation types can safely limit communications to those wherein the differential altitude is less than 700 feet. Scaling can include more than just these two types, and for this example there will be established 4 types of stations; a third type being an intermediate type of aircraft, in terms of vertical speed capability, and the fourth type an Air Traffic Control ground station. Responses to interrogations detected as emanating from ATC stations are to be made without limit to altitude differential.

In addition to using aircraft type to limit responses to a particular altitude band, type identity can also be used to scale reply message transmitter power. General aviation types have a slower speed capability than do the higher performance types. Recognizing this, whenever an aircraft is required to reply to a general aviation type, that aircraft can scale transmitter power downward to just that necessary to assure a desired minimum signal power reaching the GA type when it is at a 40-second range time distance. This will reduce the numbers of unneeded detections at other receiving aircraft. Thus, the concept of adding the measure of an aircraft's 'performance' type to data exchanges has qualifying value.

Where the numbers of communicating stations is high, the requisite data memory, and processing capability need to be commensurate. Yet both cost, and reliability dictate that capability not exceed that absolutely needed. As a way to minimize both data memory needs and data processing capability, it is a further object of this invention to add an address to all reply messages made to detected interrogations. All replies are to be 'addressed' to the interrogator for whom they are intended. By doing this, an interrogating station need process only those detected replies that have the proper address.

So that adding an address to the list of parameters to be exchanged does not add to either the complexity or the time length of inter-pulse periods, it is a further object of this invention to use as an address, part of the interrogator's altitude. Since all interrogations are to be made up of the sender's aircraft type and future altitude, his address is to be taken as being the least 4-bits of his altitude when his future altitude is determined and expressed as a binary number. How this works can be explained by this analogy. You, as an interrogator, transmit: "I'm an Air Carrier type with a future altitude of 8,400 feet. Those within an altitude band of interest please reply with your aircraft type, and differential 'future' altitude". A replier would respond with: "You at 8,400 feet, I'm 300 foot lower and am a general aviation type." (Replying with differential altitude provides as much intelligence as would absolute altitude yet requires a far reduced dynamic range for this parameter). From this reply could also be derived range, and relative bearing. Range is determined from elapsed time between the generation of an interrogation and receipt of a reply. Bearing can be determined by either of two methods. One, the differential time-of-arrival of a signal at multiple antennas of a receiving station. Secondly, by employing a phase-determining monopulse type of receiver. These are conventional techniques and are not considered as part of this invention. The use of 4 altitude bits provides a way of dividing replies into 16 altitude-increment sets. Where 4-bits is given as an example, other limits could as well be used.

The concept of using different time lengths for units of measure for different parameters can best be described by a distance analogy. Given the distance of 142 inches to represent the magnitude of three parameters, one parameter could be inches, another feet, and the third yards. This distance of 142 inches would be representative of a count of 3 yards (108 inches), 2 feet (24 inches), and 10 inches. To be useful, the magnitude of each parameter's unit time length must be scaled to be larger than the greatest count of that parameter using a lesser time unit.

In the case of aircraft communications, there are two types of messages. One, the interrogation, and the other the reply. If the interrogation message is to include only the sender's altitude and aircraft type, then there need to be only two parameters to scale. Let altitude be scaled at a maximum of 512 increments of 100 feet. Let the time length of each increment be a unit of time, that unit being established by the available spectrum space allocated for usage. For the application of an aircraft Collision-Avoidance System, the FCC has allocated a carrier frequency of 1607.5 MHz, with a bandwidth of 30 MHz. For the purposes of example, allow that a unit time be 1/15 of a microsecond (66.667 nseconds). The range of altitude units will extend from zero to 511 units of time. This means that the shortest unit of time to be used for aircraft type encoding will have to be 512 unit times or 34.133 microseconds. If it is established that a count of four different 'aircraft' types is sufficient, then this count will range from zero units, to three units, making a maximum interrogation time period equal to 2048 unit times (136.5333 microseconds).

For a reply message, the parameters of interest will be aircraft type, differential altitude, and the address. Allow that the aircraft type be limited to a count of 4, address to a count of 16, and differential 'future' altitude to a count of 128. Note that the example counts given are all numbers that are a power of 2. Expressed as binary numbers, the type would be a 2-bit number, the address a 4-bit number, and the altitude a 7-bit number. The use of binary scaling greatly simplifies the message encoding, and decoding. This will be described later. To keep the dynamic range of reply message length to a minimum, the address is to be comprised of the largest units of time. The altitude, being the parameter having the largest dynamic range can be the parameter encoded by unit time length bits (7 bits). Aircraft type will be that parameter encoded with time lengths measuring 128 unit times long (2-bits). The address then will be encoded with periods of time measuring 512 unit times each (4 bits). Thus, a maximum reply inter-pulse period will be that lasting 8192 unit times. Where a unit time is 1/15 microsecond, the maximum reply message inter-pulse time will be 546.1 microseconds. Note: an Air Traffic Control ground station would be recognized by its 'type', and response to a detected interrogation would be a reply encoding only pressure altitude (9-bits) and an address. On alternate responses to ATC interrogations, repliers could replace altitude information with aircraft ID.

There is one other type of information that needs to be included in certain cases. That is an indication of the present flight intent of the sender. This information, like the others, can be conveyed as a digital number. Allow that there might be 8 different types of maneuvers of interst. These might include climb, dive, turn left, turn right, level off or combinations. Whenever any aircraft detects a threat situation that aircraft will add to its reply message the present flight 'intent' or intended escape maneuver expressed as a number ranging from 1 to 8. By adding this information, any aircraft in a threat situation will have knowledge of the threat's intentions, hence will always be able to make complementary maneuvers. It is a further object of this invention to include the capability of adding an exchange of flight intent whenever called for by a detected threat situation. Since the utilization of exchanged intelligence poses no problems to those versed in the art, this invention will not dwell upon how exchanged information is to be used; rather, on how it can be exchanged.

Another factor that must be considered is how best to exchange both types of messages. Today's Air Traffic Control Radar Beacon System (ATCRBS) utilizes one frequency for interrogations, and another for reply transmissions. This can as well be done with this invention, yet a preferred embodiment would have the two types share the same spectrum space. The reason for this can best be explained in this manner. Consider the case where the number of communicating stations is 100. Here, there would be in each epochal exchange 100 interrogations made, and in response to these, up to $100 \times 99 = 9900$ replies. If separate but equal spectrums were used for the two types of transmissions as is the case for the ATCRBS, the reply spectrum would be far more nearly saturated than would the spectrum allocated for interrogations. By combining the two, the doubled spectrum space would permit pulse unit times half of that in the dual spectrum case. Thus, for replies, the transmitter-on times would be reduced from $9900 \times 1 = 9900$ unit times to $9900 \times 0.5 = 4950$ unit times. While a worthwhile goal, its implementation requires that there be a means by which to differentiate between message types. One means that could be used to differentiate between the two different types of transmissions would be to use a wider pulse width for interrogation messages as they would occur with less frequency than would replies. However, noise modulation of signals could affect accurate decoding if the difference in pulse widths were small. It is, therefore, a feature of this invention to use pulse-pairs as interrogation message components: A first pulse-pair indicating the start of an interrogation message, and another having a different spacing for the second, or ending part of an interrogation message.

Embodiments of the present invention utilize standard circuit elements arranged in functional modules to perform the functions and achieve the objectives indicated hereinabove. Thus one particular arrangement of the invention comprises a modulator/transmitter and a receiver coupled to an antenna via a transmit/receive switch. An interrogation message generator receives altitude data from an encoding altimeter and applies an interrogation message of the form specified above to the transmitter at regular intervals, e.g., once per second.

The output of the receiver is applied to a message-type decoder which determines the type of message and routes the message to a reply encoder, an interrogation encounter or an intent message decoder, all of which are coupled in parallel to the output of the message decoder, according to the type of message received.

The output of the reply decoder is coupled to a control stage, typically comprising a data memory and function computer, which interprets the reply message and controls displays in the cockpit to present the data to the pilot. The output of the intent message decoder is also coupled to the control stage so that the perceived intent of a decoded intent message may also be displayed to the pilot.

The output of the interrogation decoder is applied to a reply encoder to trigger the generation of a reply message to be transmitted. For this purpose, the reply encoder also is coupled to the encoding altimeter in order to be able to send altitude data. If conditions warrant the sending of an intent message, this is generated by an intent message generator in response to a signal from the reply message encoder. The intent message generator is coupled to the control stage in order to incorporate the appropriate information regarding intent in the message which is applied to the transmitter.

As a further feature of the invention, the embodiment described above may include a signature generator which is coupled to the receiver and which generates signals for application to the reply decoder and the interrogation decoder. This signature generator arrangement serves to provide further assurance against spurious replies being generated at sent out by the particular station.

It should be noted that the outstanding efficiency of communication realized in systems of the present invention, considered in terms of duration of pre-emption of the communications medium per transmitted message, derives not only from the efficiency of organization of the data but also from the manner of message encoding. As noted above in the example given, the maximum duration of a reply message (which is longer than an interrogation message) is approximately one-half millisecond. However, the actual time duration of transmitted radiation is an infinitesimal fraction of that interval. For a pulse clock repetition rate of 15 MHz, the transmitted radiation in a reply message consists of only two pulses—one at the beginning and one at the end of the message—of 1/15 microsecond (approximately 67 nanoseconds) each. The rest of the time allocated to the reply message, the transmitter is off so that (1) the station can receive and/or transmit other messages to other interrogators, and (2) the communication medium is clear for others to use.

BRIEF DESCRIPTION OF THE DRAWINGS

A better understanding of the present invention may be gained from a consideration of the accompanying drawings in which:

FIG. 4 is a schematic block diagram of a signature generator circuit, corresponding to another of the functional blocks in the system shown in FIG. 1;

FIG. 8 is a schematic block diagram of an intent message generator, corresponding to another one of the functional blocks shown in the system of FIG. 1;

FIG. 9 is a schematic block diagram of an intent message decoder, corresponding to another one of the functional blocks shown in FIG. 1;

FIG. 10 is a diagram showing the waveforms of various types of messages which are provided in the system of the present invention; and FIG. 11 is a diagram showing particular phase relationships of certain waveforms in the system of the present invention.

DESCRIPTION OF THE PREFERRED EMBODIMENTS

Figure 1:
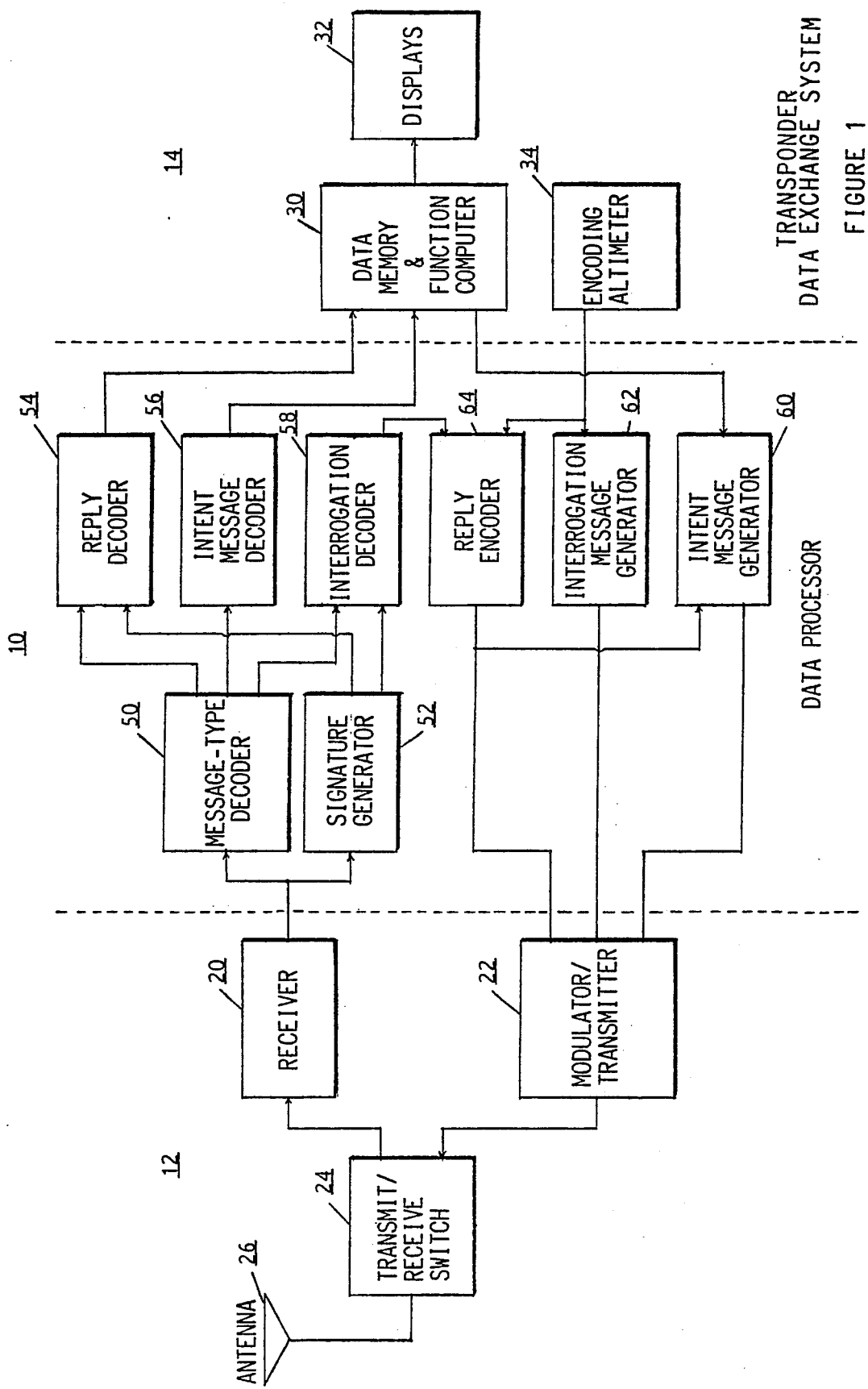
FIG. 1 is a schematic block diagram of a communication station for use in systems in accordance with the invention.

FIG. 1 is a block diagram showing a preferred embodiment of the invention in an interrogator/remitter type of transponder system. The diagram shows the system divided into three major sections: a data processor section 10 interconnected between a transmitter/receiver section 12 and a control/display section 14. The second 12 is shown comprising a receiver 20 and a modulator/transmitter 22, both of which are connected to a transmit/receive switch 24 which in turn is connected to an antenna 26. The elements of the transmitter/receiver section 12 are standard commercial items and need not be explained in detail.

Similarly, the section 14 comprises standard commercial items: a data memory and function computer 30, a display stage 32 couple to be driven by the computer 30, and an encoding altimeter 34 coupled to provide an input to one of the stages of the data processor section 10. Since these elements of the section 14 are well known, commercially available items, they need not be discussed in detail.

The data processor section 10 comprises a plurality of individual circuits designed to perform particular operations in accordance with the present invention. The section 10 is shown in the functional diagram of FIG. 1 as comprising a message-type decoder 50, a signature generator 52, a replay decoder 54, an intent message decoder 56 and an interrogation decoder 58 connected to receive messages at the output of the receiver 20 and to provide resulting data to the computer 30. The lower half of the drawing figure illustrates an intent message generator 60, an interrogation message generator 62 and a reply encoder 64 which receive inputs from the control section 14 and supply messages to the modulator/transmitter stage 22 of the section 12 for transmission at the antenna 26. Although the functional blocks of the data processor section 10 comprise conventional, commercially available circuit components, modular chips, etc., the circuit arrangements of these blocks may be unique and these are therefore shown in detail in the following figures and are described hereinbelow.

Figure 2:
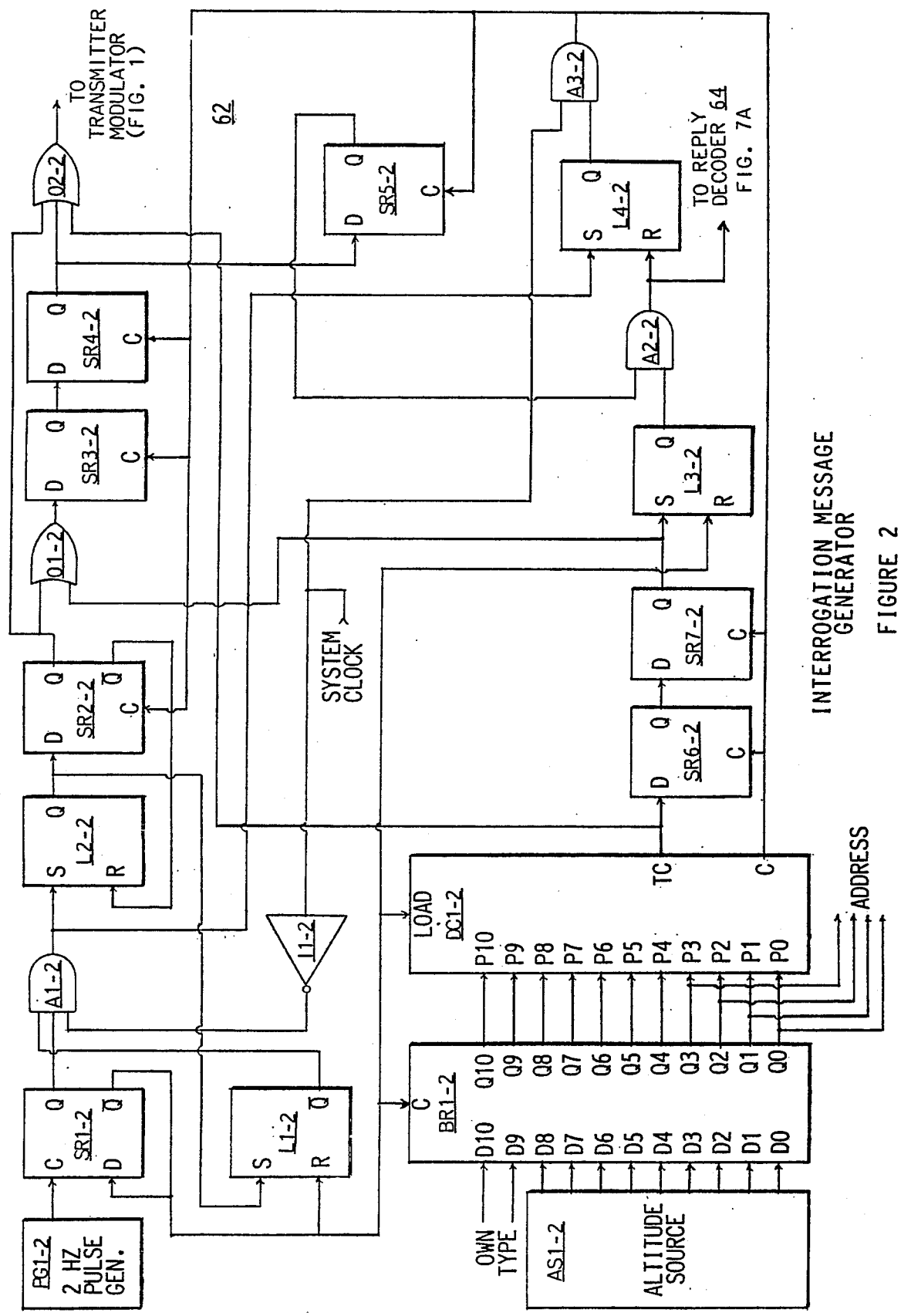
FIG. 2 is a schematic block diagram of an interrogation message generator, one of the functional blocks shown in the system of FIG. 1.

Interrogation Message Generator (FIG. 2)

The Interrogation Message Generator circuit is shown in block diagram form in FIG. 2. This circuit serves to generate an interrogation message beginning and ending with respective pairs of pulses with the time separation between the pulse pairs serving to define the encoded intelligence. The circuit of FIG. 2 and its operation are described as follows.

A 2-Hz pulse generator PG1-2 serves as a master timer. Its output serves to clock a divided-by-two flip flop SR1-2. At midperiod, when the Q-not output of SR1-2 is high, altitude information and aircraft (station) type information are loaded into a buffer register BR1-2. This register's contents provide a parallel load input to a down counter DC1-2. Also, the 4 least significant altitude bits are brought out to be used as an address reference for use by the reply decoder circuit.

The Q-not output of SR1-2 also serves to reset Latch L1-2 making its Q-not output high. This output provides one input to AND gate A1-2. Another input is the system clock signal, inverted by inverter I1-2. When the clock signal is low, the inverted output from I1-2 is high. At the next pulse from PG1-2, the Q output of SR1-2 goes high, and Q-not low. This makes the three inputs to A1-2 high and its output goes high, serving to set latches L2-2, and L4-2. The Q output from latch L2-2 serves as a data input to shift register SR2-2, and also serves to set latch L1-2 making its Q-not output low. The next positive transition of the system clock shifts the signal present at the data input of SR2-2 to its output (Q). The Q-not output of R2-2 goes low, resetting latch L2-2. The Q-high out of SR2-2 serves as the start of a first interrogation transmission pulse coupling to the system's transmitter modulator through OR gate O2-2. It also serves as a data input to shift register SR3-2 through OR gate O1-2. The next clock pulse brings the output of SR2-2 low, terminating a first pulse, and shifts the Data in SR3-2 to its output where it connects to the data input of SR4-2. A third clock pulse makes the output of SR4-2 high. This provides the start of the second interrogation pulse, and it couples to the transmitter through OR gate O2-2. The high out of SR4-2 also serves as a data input to shift register SR5-2. On the next clock pulse, the second interrogation pulse terminates and the output of SR5-2 goes high, providing a high input to AND gate A2-2. This lasts only until the next clock pulse which makes the output low again.

In the meantime, all clock pulses have been decrementing the preset count in downcounter DC1-2. No further action occurs until DC1-2 reaches a count of zero. At this time, its terminal count output TC goes high, providing a high data input to shift register SR6-2, and also providing the start of another transmission pulse through OR gate O2-2. The next clock pulse terminates the high out of the downcounter, and shifts the 'data' through SR6-2 and into SR7-2. On the next clock pulse, the output of SR7-2 goes high transferring its output into SR3-2 through OR gate O1-2. Also, it sets latch L3-2 whose Q output provides one input to AND gate A2-2. Two clock pulses later, the output of SR4-2 again goes high, providing the start of the last interrogation message pulse and providing a data high into shift register SR5-2. On the next clock pulse, the transmitted pulse terminates, and the output of SR5-2 becomes high. This, through AND gate A2-2 resets latch L4-2. Its Q output goes low, bringing one input to AND gate A3-2 low, and further clocking is inhibited.

Thus, two pairs of pulses have been generated. The first pair were spaced at two clock pulses apart, and the second at four clock pulses apart. The time betwen the beginning of the first pulse and the beginning of the third pulse was established by the preset count of downcounter DC1-2, and represents the encoded intelligence. The high out of AND gate A2-2 is also used by the reply decoder 64 to initiate a reply process cycle.

Figure 3:
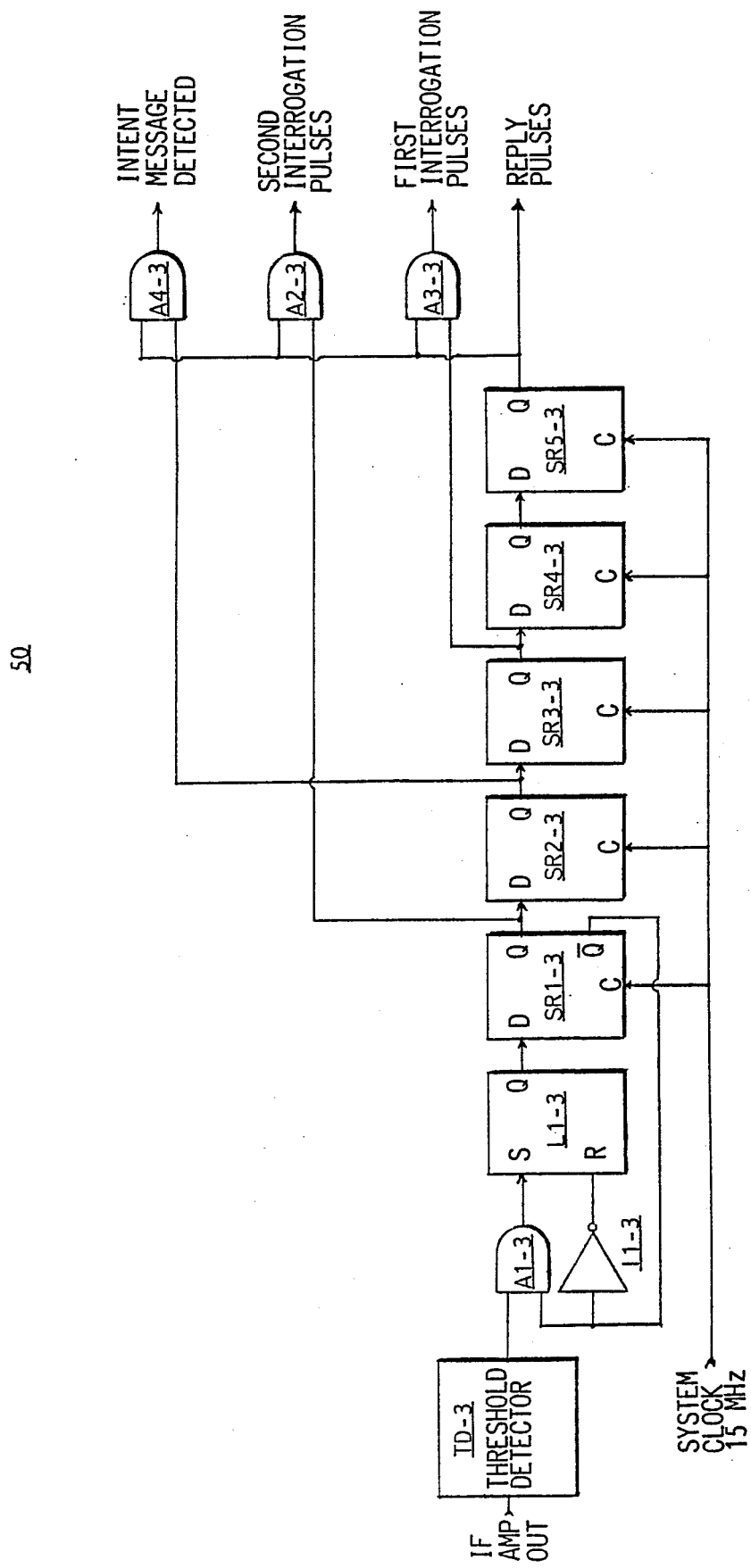
FIG. 3 is a schematic block diagram of a message type decoder, corresponding to another of the functional blocks in the system of FIG. 1.

Message-Type Decoder (FIG. 3)

The Message Type Decoder 50 in the station's data processor 10 serves to synchronize the detected pulses of a received message with the station's clock in order that the message may be identified as to type: reply, interrogation, or a flight intent message. It is intended tht the intent messages be representated by the time spacing between a reply's second pulse and a special 3rd pulse. However, so that randomly spaced single pulses are not interpreted as intent messages, the intent indicator will be a pair of pulses. For this example the pair spacing will be three unit times so as to make it different from the two interrogation message pairs which are spaced at two and four pulses apart respectively. A particular circuit for this purpose is represented in block diagram form in FIG. 3 and is described as follows.

In FIG. 3, pulse signals of a received message are applied through a threshold detector TD-3, the output of which serves to set latch L1-3 through AND gate A1-3, making its Q output high (on). This connects to the data input of the following shift register SR1-3. On the next positive transition of the system's clock, the Q output of SR1-3 goes high and the Q-NOT output goes low, resetting latch L1-3 through inverter I1-3. It also serves to inhibit a contiguous signal from resetting latch L1-3 by providing a low signal to one input of AND gate A1-3. The next system clock pulse shifts the data-high into SR2-3, and the Q output of SR1-3 returns low and its Q-NOT output goes high, enabling latch L1-3 to be set by subsequently received pulses. Following clock pulses shift any loaded data through SR2-3, SR3-3, SR4-3, and SR5-3 in succession. Any output from SR5-3 is considered to be a reply type message pulse. If, when the output of SR5-3 is high, the output of SR3-3 is also high, then both inputs to AND gate A3-3 will be high, and its output high. This is the decoding of the first interrogation message pulse pair. When both the output of SR5-3, and SR1-3 are high, then both inputs to AND gate A2-3 will be high. Its output, now being high, will be indicative of receipt of a second interrogation message pulse pair. When the output of SR5-3 is high along with the output of SR2-3, then the pair signify an intent message at the output of AND gate A4-3.

It should be noted that, because the pulses from the latch L1-3 are delayed by the five shaft register stages, the delay time is included as part of the range-measuring time delay needed after each interrogation to allow for interrogation process and reply encoding. Signature data associated with each pulse are determined at the first system clock time after signal detection. The signature data also are delayed through a 5-stage shift register so that when a received-signal message emerges from one output of the message-type decoder 50, the signature data for that message type will also be in time step.

As shown, pulses that are really part of interrogation messages, and those of intent message pairs are also treated as reply messages. This is done so that no randomly received reply pulses whose time spacing is the same as the interrogation pairs or intent message pairs will be rejected. Rather, interrogation and intent message pulses are processed erroneously, yet will cause little chance for the generation of any false signal.

THE SIGNATURE GENERATOR (FIG. 4)

In order to properly pair up pulses emanating from the same source, there needs to be a means by which to characterize detected pulses. Those parameters of a detected signal that can be used to do this include signal strength, time of detection relative to receiver's system clock, and source bearing. FIG. 4 is a block diagram of a signature generator circuit provided to develop a digital count that would be a number determined by both a detected signal's strength and its time of detection, relative to the receiving system's clock.

Strength is measured by integrating the signal voltage over the period in which the signal level exceeds a pre-selected threshold level. The same signal input from the receiver 20 (FIG. 1) as is applied to the threshold detector TD-3 of FIG. 3 is also applied to a threshold detector TD1-4 and to an envelope detector ED1-4 in FIG. 4. Signals from the envelope detector ED1-4 are applied to a pair of integrators INT1-4 and INT2-4 which in turn drive analog-to-digital (A/D) converters AD1-4 and AD2-5. Typically, during integration, the A/D converter is in the track mode. At the end of the integration period, the A/D converter goes into the hold mode and its output is a digital word representing signal strength that connects to the input of a data register R1-4 or R2-4. The next system clock pulse would then load the converter's output into the register.

At the same time as the signal strength is being measured, a measurement is being made on the time difference between its detection and the next system clock pulse. This is done by having a detected signal set a latch L1-4. The latch, in its set state, enables the clocking of a reference frequency in a counter C1-4. This would typically be a frequency much hgher than the system clock frequency. For example, a frequency of 240 Mhz could be used in order to provide a count up to 16 during a system clock period when the system clock frequency was 15 MHz. The latch L1-4 would be reset by the positive transition of the next system clock pulse. When this occurred, the existing count in counter C1-4 would be loaded into a data register R3-4 and then the counter C1-4 would be reset.

Measuring the signal strength takes one clock period more than that needed to determine time difference, or 'phase'. Hence, the phase count would pass through a second data register R4-4 in order to make it synchronized with the associated signal strength count. Then the 'counts', a 4-bit count for phase, and a 4-bit count for stregth, would be inputs to a 8-bit register R5-4. The 4 least significant bits serving as the signal strength measure, and the 4 most significant bits representing the phase count. Thus, the register's output would be an 8-bit word providing one digital count that would be representative of a signal's 'signature' or unique characteristics. Where a system had the capability to determine the bearing of a received signal, the bearing would be an additional parameter used to characterize a particular source's signals. Bearing information could be encoded as a 6-bit digital count. To use it would entail using a 14-bit register to hold it and the phase and strength information.

In FIG. 4, the output of a signal receiver's IF amplifier feeds both a threshold detector TD1-4 and an envelope detector ED1-4. Since there needs to be time to fully reset an integrator after it is used to measure the strength of a received signal, two signal processors would be used to determine its strength. The output of the threshold detector TD1-4 connects to a toggle flip flop TG1-4, and also to AND gates A1-4, and A3-4. The state of the toggle TG1-4 determines which process is active for a particular signal. As shown, the output of the envelope detector ED1-4 connects to both integrators INT1-4 and INT2-4 in parallel. Once a received signal strength exceeds the level set by the threshold detector TD1-4, the active integrator is enabled. If the toggle Q is high, then integrator INT1-4 would be the active one. The output of AND gate A1-4 enables the integrator to integrate the output of the envelope detector. Through inverter I1-4, the analog-to-digital converter AD1-4 is placed in its track mode. Its output connects to a data storage register R1-4. At the end of the detected pulse, the output of the threshold detector TD1-4 goes low. This disables further integration and, through inverter I1-4, places the A/D converter AD1-4 into its hold mode. The next system clock, through AND gate A2-4, loads the A/D converter's output into register R1-4. Inverters I2-4 and I3-4 provide a delay so that clocking of R1-4 cannot occur until enough time has elapsed to make the data into R1-4 valid. The output of register R1-4 connects to one input of a 4-bit OR gate O1-4. The output register R2-4 connects to the second input of the OR gate O1-4. The output of the OR gate O1-4 provides the 4-bit count representative of a received signal's strength. This connects to the least 4 significant bits of an 8-bit parallel shift register R5-4. The other input is the output 4-bit register R4-4 that contains the delayed 'phase' count of the pulse whose strength has just been measured. The output of the 8-bit register R5-4 connects to the data input of a second shift register R6-4. Subsequent system clock pulses shift the compiled 8-bit 'signature' count out to be used by the interrogation decoder 58 and the reply message decoder 54 (FIG. 1). The delay time is scaled so that the 'signature' count will be synchronized with the time-of-arrival time measured when a pulse appears at the output of the message-type decoder (FIG. 3).

On detection of a following signal, the output of the threshold detector would change the state of the toggle flip fop TG1-4, and the next signal would be processed by the second integrator, A/D converter and associated logic circuitry. Thus, each time that an integrator is used, its output will have been fully reset so that a more correct measure of a signal's strength can be made.

Where a signal receiving system has the capability to determine the bearing of a signal's source, that bearing would be converted to a digital number, then added as the next higher 6 significant bits to the strength and phase counts as indicated by the broken line on R5-4 to make an even more accurate signature measure.

INTERROGATION MESSAGE DECODER (FIG. 5)

Figure 5A:
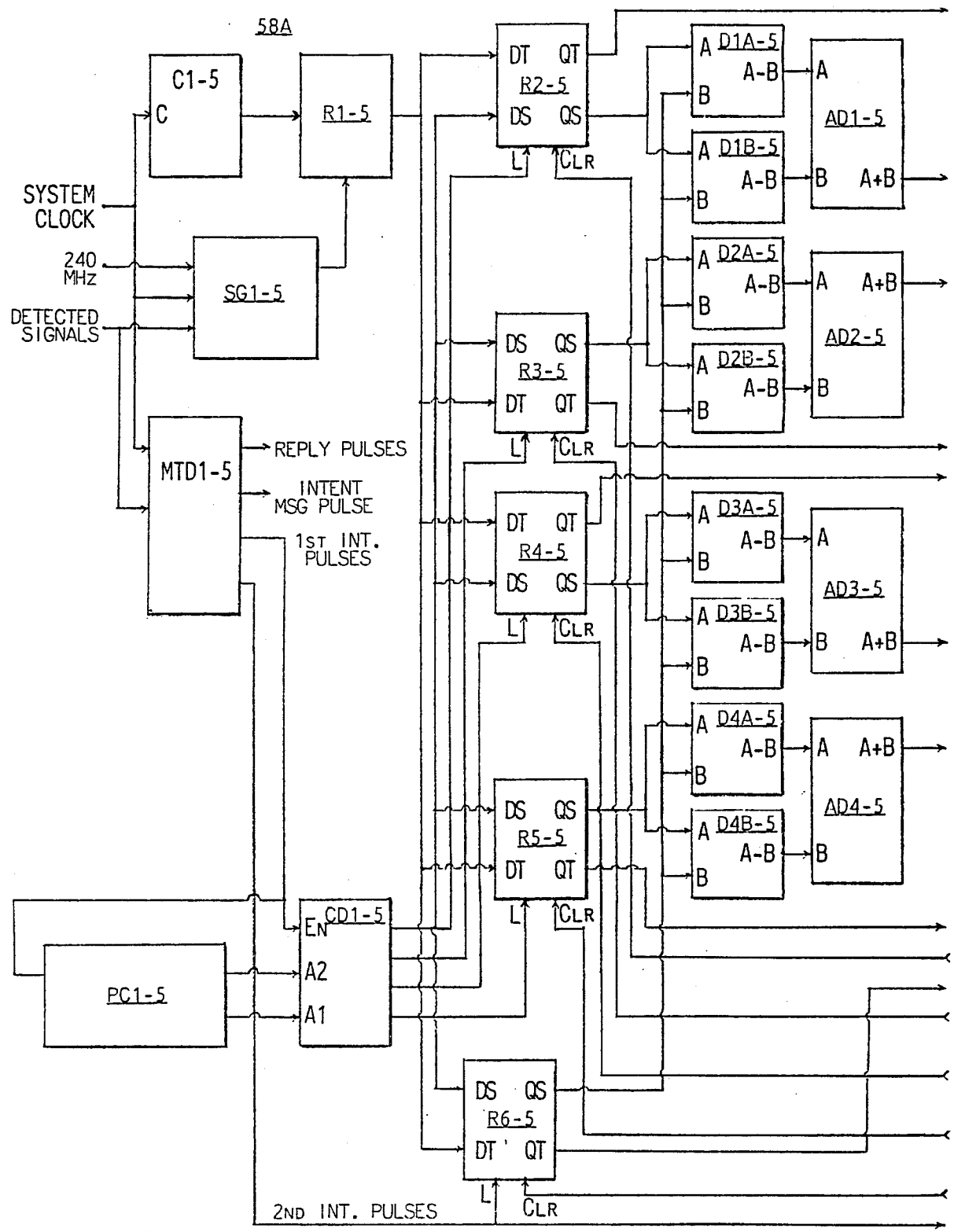
FIG. 5 is a schematic block diagram of an interrogation decoder, corresponding to another of the functional blocks shown in the system of FIG. 1.
Figure 5B:
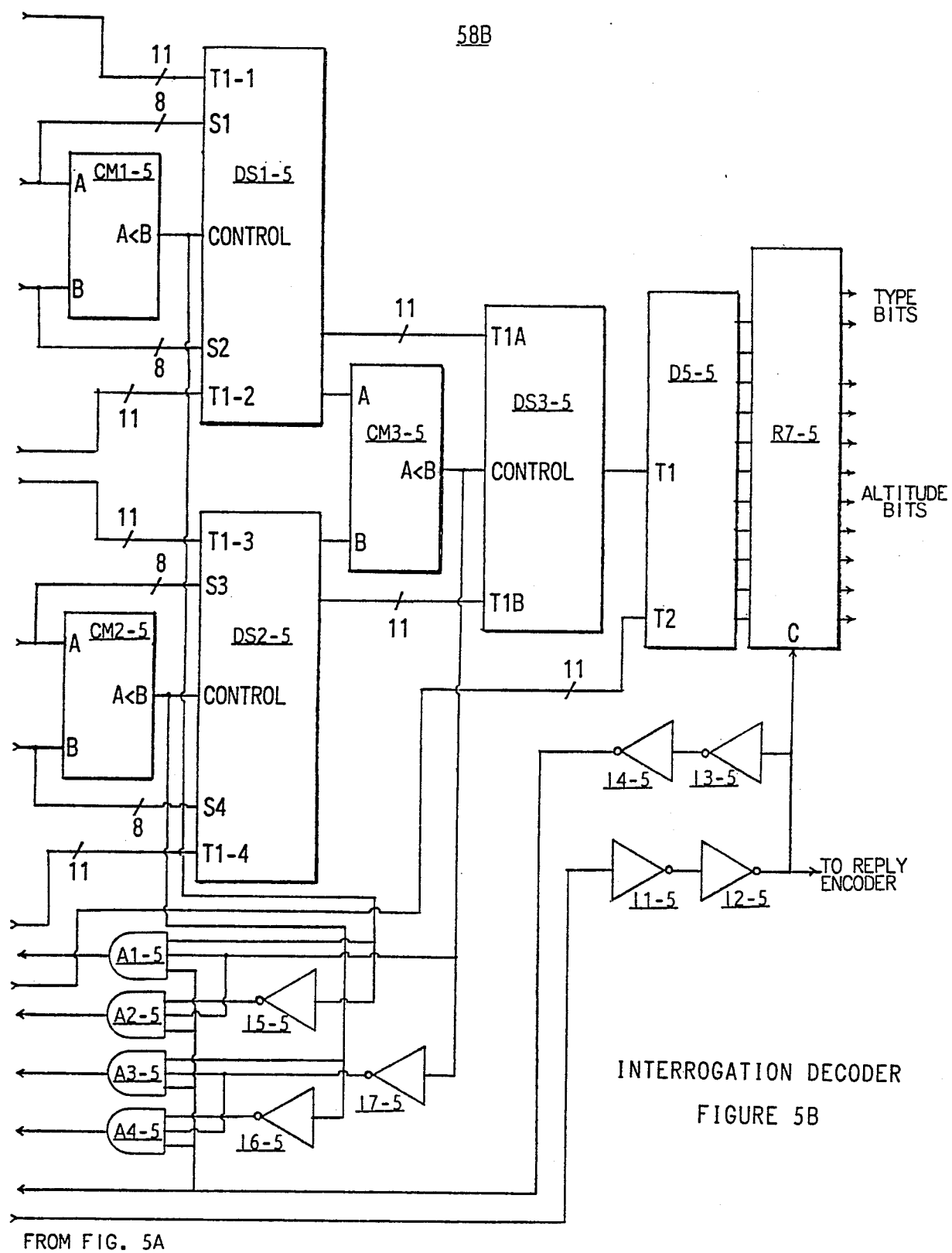

The Interrogation Message Decoder 58 is shown in block form in FIG. 5. Received pulse pairs making up an interrogation message are first decoded in the Message-Type Decoder MTD1-5 (shown in FIG. 3) which provides one output for first interrogation message pulse pairs, a second output for second interrogation message pulse pairs, a 3rd output for reply pulses, and a 4th for intent message pairs. A station continually receives pulses, except during transmission periods, with the intent of decoding all that could comprise an interrogation message. As received pulses are detected, they are tagged with a time of arrival (phase) count, and a signature count. The makeup of and the implementation for generating signature counts is given detail in the SIGNATURE GENERATOR section.

In decoding either interrogation messages or reply messages, a first task is to pair up pulses that have been generated by the same source. This is done by comparing signature counts assigned to any messages's second transmission with signature counts detected earlier from what could be a number of 'first' message elements generated by several different sources. FIG. 5 is a block diagram showing how this can be done when only signal strength and 'phase counts' are available to constitute any source's signal characterization at a receiving station. The same processing could be expanded to include bearing information where it is available.

The difference in detected signal strength between a second message element and a first is determined in a difference circuit. Likewise, the difference in 'phase counts' betwen a second message element and a first is also measured. The two differences are then added together to comprise an overall signature difference count. One overall count is made for every first message element that precedes a second message element. Then comparator circuits are employed to determine which, of several, signature-difference counts is the lowest (best match). That one then has its time-of-arrival count subtracted from the second message element's time of arrival. This difference, or time interval, is the encoded message. For interrogation messages in this example, the message content will be the sender's pressure altitude, and his aircraft (station) type.

Referring to FIG. 5, a system clock signal (ex. 15 MHz) continually clocks an 11-bit counter C1-5, the signature generator SG1-5, and the message-type decoder MTD1-5. Detected signals connect to the signature generator, and the message-type decoder. When a first interrogation message pair is decoded in the message-type decoder, that signal's time-of-arrival, denoted by counter C1-5's output, along with its 'signature' information appears as inputs to memory registers R2-5, R3-5, R4-5, and R5-5. The decoded 1st interrogation message pulse out of the Message-Type Decoder also serves as a clock signal into pulse counter PC1-5. The output of PC1-5 provides an address into a 1-of-4 decoder CD1-5. For a given address, one of the four outputs of CD1-5 will go high. That one serves as a data-loading strobe into its associated register (R2-5 to R5-5), loading the 1st interrogation message data into the register. For an address of 1, the selected register is R2-5. Subsequently received first interrogation message elements are loaded into other registers (R3-3 to R5-5). The time-of-arrival information from each of the 1st interrogtion message elements loaded into these 'holding' registers connects to data selector inputs (DS1-5 and DS2-5) from their respective holding registers (R2-5 to R5-5). The signature information out of each of these registers are broken into their two components (strength and phase). The strength parts connect to subtractor modules D1A-5, D2A-5, D3A-5, and D4A-5. The phase counts connect to subtractor units D1B-5, D2B-5, D3B-5, and D4B-5. When a second interrogation message element appears at the output of the message type decoder, its time-of-arrival and signature information is loaded into register R6-5. The outputs of this register connect to the second inputs of subtractors D1A-5 thru D4B-5. The difference out of each subtractor connect to adder units. The adders serve to combine the strength difference and the phase count difference between the 2nd interrogation element, and each of the 1st interrogation elements. The outputs of the adders then are numbers representative of the signature differences. These appear at the outputs of AD1-5, AD2-5, AD3-5, and AD4-5. The outputs of AD1-5 and AD2-5 connect as the two inputs to comparator CM1-5. The outputs of AD3-5 and AD4-5 connect as the two inputs to comparator CM2-5. The signature differences out of the adders also connect as inputs to the data selectors DS1-5 and DS2-5. Between Adders AD1-5 and AD2-5, whichever has the lowest count results in the output of its comparator effecting control of the data selector DS1-5 so as to provide the time-of arrival, and the signature difference of that 1st interrogation message element at the output of DS1-5.

Likewise, the outputs of AD3-5 and AD4-5 connect as inputs to comparator CM2-5, and data selector DS2-5. Again, whichever signature difference is the smaller effects control of data selector DS2-5 so that both the signature difference, and the associated 1st interrogation message element's time-of-arrival appear at the output of data selector DS2-5. The signature difference out of these two data electors connect to respective inputs to a third comparator CM3-5. The time-of-arrival counts from each data selector outputs connects as inputs to a third data selector DS3-5. As before, the smaller signature difference signal causes the output of CM3-5 to control data selector DS305 making its time-of-arrival count appear at the output of DS3-5. This output constitutes the time-of-arrival of the 1st interrogation message element whose signature information best matches that of the 2nd message element. Both time-of-arrival counts connect as inputs to subtractor D5-5. The output of D5-5 connects to the input of memory register R7-5. The second interrogation message element pulse out of the message type decoder, and delayed by inverters I1-5, and I2-5 serves as a clock into register R7-5 effeting loading of the difference data out of subtractor D5-5. This difference is the decoded interrogation message, and appears at the output of R7-5 as the interrogator's pressure altitude, and the aircraft (station) type.

The 2nd interrogation message element pulse out of delay inverter I2-5 is further delayed by inverters I3-5 and I4-5. The output of I4-5 serves as a register clearing pulse clearing the contents out of R6-5, and whichever 1st element register held the signature information best matching that of the 2nd interrogation message element. The control of the clearing is accomplished by the logic comprised of AND gates A1-5, A2-5, A3-5, and A4-5 along with inverters I5-5, I6-5, and I7-5. With the output of I4-5 as the third input to these AND gates, a clearing signal high will be produced by the AND gate whose output connects to the CLEAR input of the 1st interrogation data register producing the best signature match.

While this block diagram shows how processing can take place when there are only four 1st interrogation elements preceding a 2nd interrogation element, the circuitry could be expanded to include a capability for a greater number as well. As shown, all of the processing needed to decode an interrogation message can occur within one system clock pulse period after a second interrogation message element is detected. Thus, interrogation messages can be decoded on contiguous system clock cycles when such decoding is called for.

Figure 6:
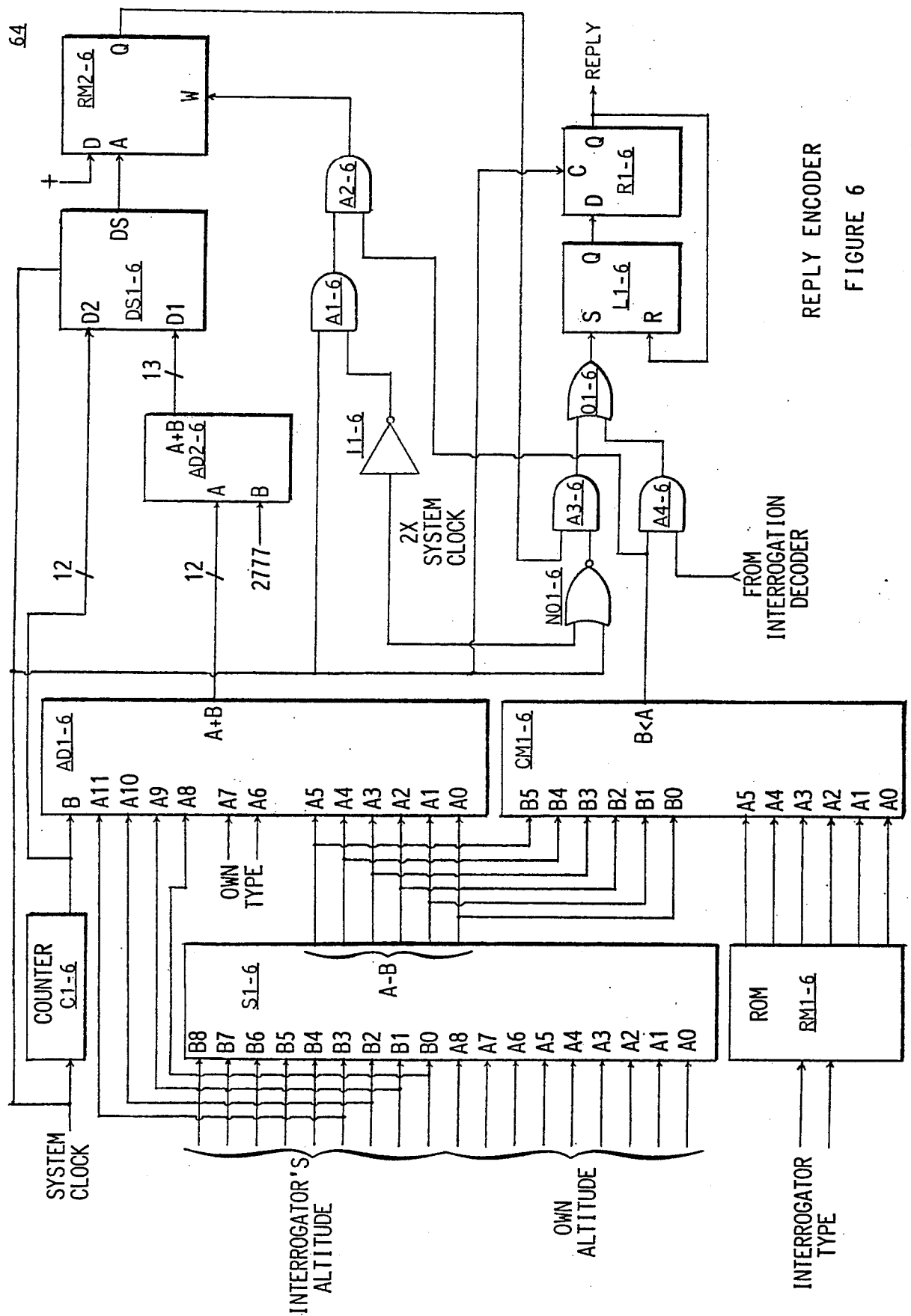
FIG. 6 is a schematic block diagram of a reply encoder, corresponding to another of the functional blocks shown in the diagram of FIG. 1.

Reply Message Encoder (FIG. 6)

Refer to FIG. 6 for a block diagram of the reply message encoder 64. A nine bit subtractor (S1-6) has as inputs the replier's own (future) altitude, and the detected interrogator's future altitude. The absolute difference appears at the output of S1-6, and connects to two other modules, a comparator CM1-6 and an adder Ad1-6. The detected interrogator's aircraft (station) type two-bit word connects as the address into a ROM RM1-6. The output of this ROM is a number indicative of the maximum altitude differential requiring that a reply need be sent. This ROM is scaled to compare own aircraft (station) type and the interrogator's type. The output of the ROM RM1-6 being the limit altitude differential, is a second input to the comparator CM1-6. The adder AD1-6, in addition to the differential altitude which appears as the least six significant bits of one input, has own aircraft (station) type as 2 more significant bits, and the interrogator's 'address' (4 least significant altitude bits) as the four most significant bits of one 12-bit input word to the adder. The other 12-bit (B) input to the adder is the output of a system-clock counter. The output of adder AD1-6 is one input to adder AD2-6. The other input to AD2-6 is a count representative of the system's maximum range. In this example, it would be a 45-second range for two aircraft closing at 1200 knots and is the limit for a system for subsonic aircraft (2777). For a system designed to include Mach-5 aircraft, this number would be changed to 11885 to allow for the needed greater range capability.

The output of counter C1-6 represents the 'present' time at which a first pulse of a reply may be sent, and the output of the adder AD2-6 represents the 'future' time at which a second pulse of a reply is to be sent. These two 12-bit words serve as inputs to a data selector DS1-6. Whenever there is a decoded interrogation message present, and the computed altitude differential is less than the established maximum, the output (B<A) of comparator CM1-6 and AND gate A4-6 will be high. Through OR gate O1-6, this sets latch L1-6 which provides a data 1 into register R1-6. At the next system clock pulse positive transition, this data is transferred to the Q output of R1-6 and is the start of a first pulse of a reply. It would connect to the modulator of the station's transmitter. On the next clock pulse, should there be no interrogator data, the pulse would terminate. The same clock pulse into the control of data-selector DS1-6, which has both the 'present' time and the 'future' as inputs, selects as the DS1-6 output the 'future' time when it is high, and the 'present' time when it is low. The output 12-bit word from DS1-6 serves as the address into a memory RAM RM1-6. While the system clock pulse is high, it provides a high into one input of AND gate A1-6. A second input comes from a double-frequency clock signal source whose polarity is inverted by inverter I1-6. When this clock signal is a logic low, the second input to AND gate A1-6 is high thereby causing its output to be a high. This high, and a 'reply required' high out of comparator CM1-6 into AND gate A2-6 causes its output to go high and serve as a 'WRITE' strobe into the RAM RM1-6. Since the RAM's data input is tied to a logic-one source, a logic one is written into the established future address of the RAM. When the system clock goes low, and the 2XF clock is low, the output of the NOR gate NO1-6 becomes high. The RAM is in the read mode, and the address is now the present address. If a logic 1 resides at this present address it, through AND gate A3-6 and OR gate O1-6, sets latch L1-6. This results in the start of a 'second' pulse of a reply at the time of the next system clock pulse. A subsequent clock pulse would change the RAM's address and normally terminate the reply pulse unless there were two contiguous pulses to be sent. In that event, two contiguous pulses would be transmitted.

Thus, each time an interrogation message is detected, and its contents call for a reply, a first apply pulse would immediately be generated, and the time delay for the second would be loaded as a future address into the RAM. When that future address becomes the present address, the second pulse is generated. By this means, reply messages can be generated totally within one clock period. Should there be no interrogation message data, no pulses are generated. Should the altitude differential indicate a difference greater than that of interest, no reply would be made.

The double-speed clock signal would preferably come directly from a 'reference' oscillator source, and the so-called system clock signal would be obtained by dividing the double-speed clock signal by two in a toggle flip flop.

REPLY MESSAGE DECODER (FIGS. 7A–7B)

The purpose of the reply message decoder is twofold. First, one function is to identify which, of many, pulses emanate from the same source. Next, the decoder must then determine the time separating two pulses pairs which have been identified as from the same source and decode, from that time, the contents of the message. So that only detected reply pulses that could be a response to an interrogation are processed, the decoder includes a decoder on-time controller.

The controller provides two active response periods. The first is the period of time following an interrogation. It begins after that period of time subsequent to an interrogation that includes the interrogation message time, and the message decoder time. This first period then enables processing of detected reply pulses for a time that represents a system's maximum range of interest. For aircraft flying under 10,000 feet above ground level (agl) that range would be a 45 second range for a maximum closing rate of 500 knots (speed limit of 250 knots imposed on all). This would be represented by a system clock count of 1157 unit times. Above 10,000 ft. agl, sub-sonic aircraft would have a maximum 45- second range that would be a system clock count of 2777. Once the Interrogator's maximum range count has elapsed, then no further reply pulses would be processed until a standard established maximum range count has elapsed. Here, if that standard is for subsonic aircraft, the maximum range count representing the system's design maximum would be a count of 2777 unit times (45 seconds closing at 1200 knots). For a standard system based upon a maximum Mach-5 capability (Mach 10 closing), a 45-second range count would be 13885 counts and this is the count to be attained before any second reply sets were to be genersated or accumulated.

Figure 7A:
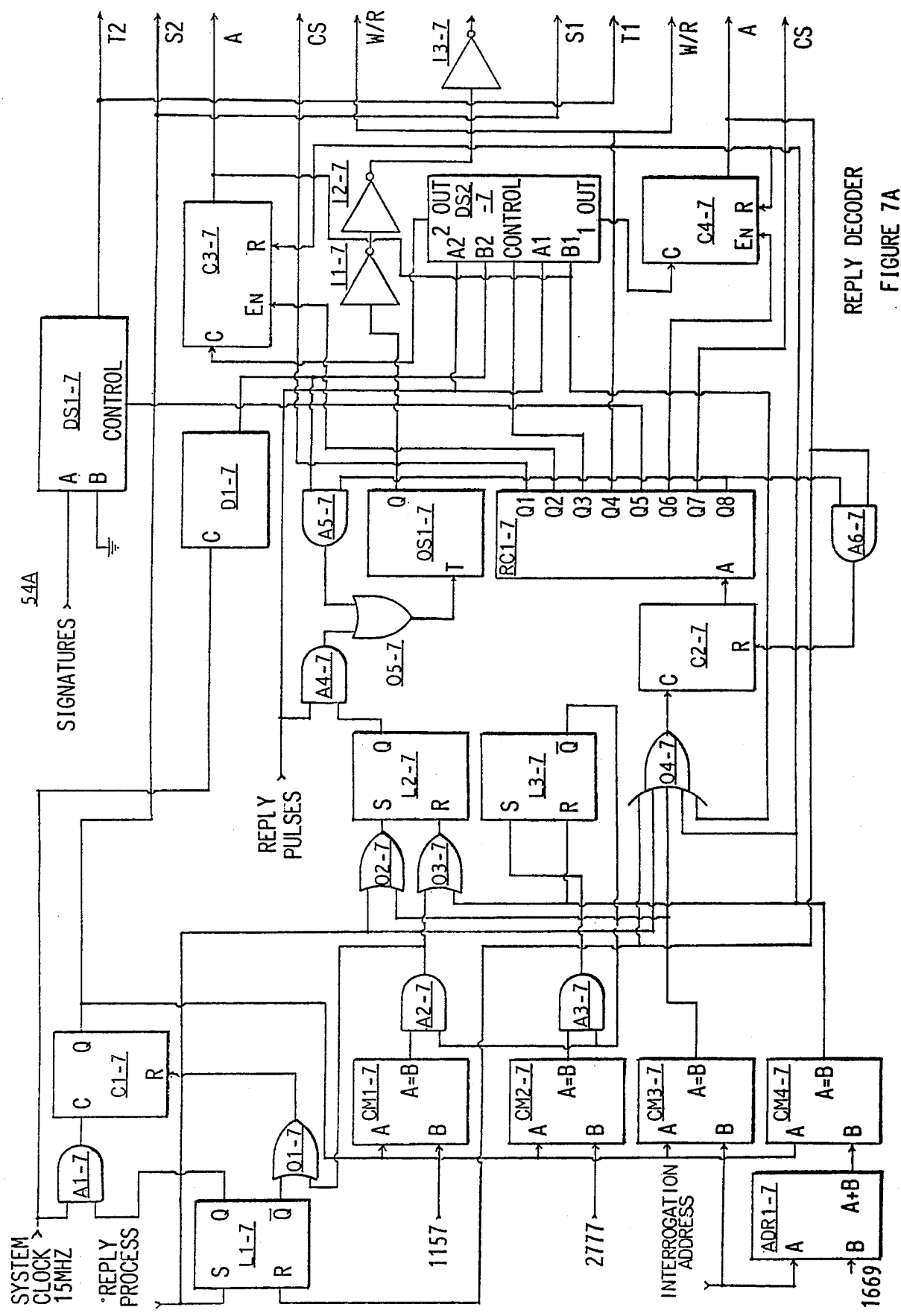
FIGS. 7A–7B together represent a schematic block diagram of a reply decoder, another one of the functional blocks in the system of FIG. 1.
Figure 7B:
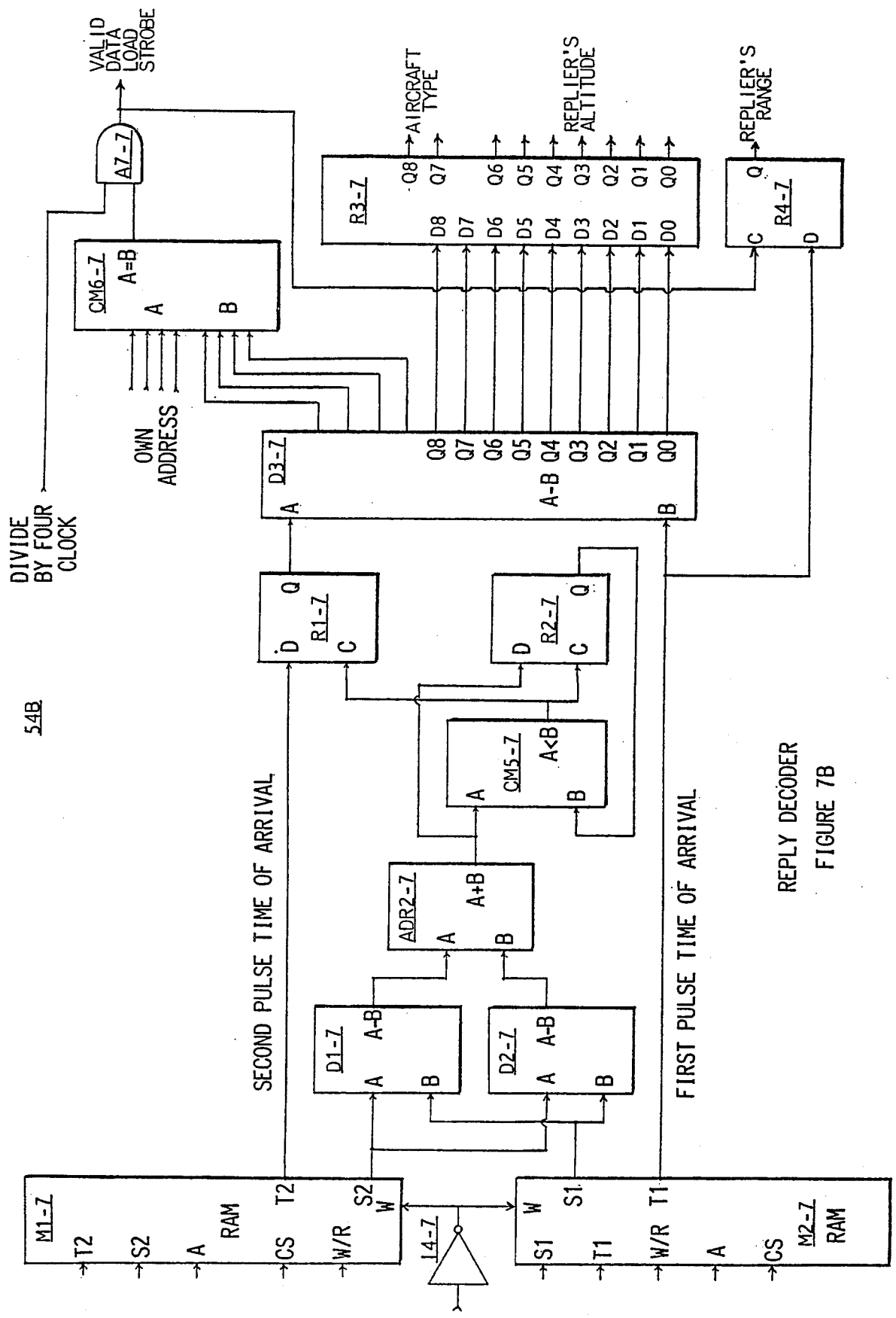

During this 'first' reply acquisition time, those pulses detected would have their time of arrival information and signature information stored in a Random-Access Memory unit (RAM). The decoder would then reset a 'range' counter and wait for the elapse of a time period representing the address count of the interrogator, after which, reply pulse data would again be acquired and stored in a second RAM. This time, the data-acquisition period would be for a system clock count that represents a second range of interest, plus the time for a reply message of maximum length (less the address count). At the end of the second time period, the decoder would stop accumulating reply pulse data and turn to processing the acquired data. Once all data was processed, the decoder would clear the data memory registers. FIGS. 7A and 7B comprise a block diagram of such a reply decoder and its operation is described as follows.

The system's interrogation message generator (FIG. 2) provides a reply decoder cycle-initiate pulse that occurs at a time that is the sum of the interrogation message's time and five clock periods representing the time required for processing in the message decoder module. This is the time required for repliers to respond to an interrogation, and is a range-zero time. This pulse sets latch L1-7, latch L2-7 (through OR gate O2-7), and increments counter C2-7 through OR gate O4-7. In its set state, latch L1-7 enables counting of the system 15 MHz clock by counter C1-7. This 'range' count connects to the inputs of comparators CM1-7, CM2-7, CM3-7, CM4-7, and to time data inputs T1 and T2 of data memory RAMs M1-7, and M2-7. Latch L2-7, in its set state, enables processing of reply pulses. When the count reaches the interrogator's range of interest (1157 in this example), the output of comparator CM1-7 goes high, resetting latch L2-7. This ends the first period of reply pulse data acquisiton. During this period the following operations occur. The ROM controller RC1-7, with an input address of 1, directs each detected reply pulse through the 1 output of data selector DS2-7 to serve as a clock signal into counter C4-7. This counter's output is the address into a data memory RAM M2-7. The ROM controller RC1-7 provides a high output at Q7 into the chip select input (C) of M2-7 making it functional. Another output from Q4 of the ROM controller RC1-7 places both RAMs M1-7 and M2-7 into their write modes. With each detected reply pulse is a write strobe generated by a one-shot multivibrator OS1-7. This strobe is delayed by inverters I1-7, I2-7, I3-7, and I4-7 so that it can write into the RAM both time-of-arrival data at input T1, and the reply pulse's signature data at input S1, once this data and the address are valid.

At the end of the maximum range of interest time, as evidenced by a count of 1157 and a high out of comparator CM1-7, Latch L2-7 is reset, inhibiting further acquisition of pulse data that represents data of first pulses of a reply pair. Once a count representing the system's maximum range is attained (2777 in this example), a high out of comparator CM2-7 sets Latch L3-7 through AND gate A3-7, and resets the range counter C1-7 through OR gate O1-7. A second range count then begins. This time the counts of 1157 and 2777 are ignored as the Q-not of set latch L3-7 disable AND gates A2-7, and A3-7. When the count reaches that representing the interrogator'address, the output of comparator CM3-7 goes high. This, through OR gate O2-7, again sets latch L2-7, enabling processing of a second set of reply pulses. The output of CM3-5 also serves as a clock pulse into counter C2-7 through OR gate O4-7. This increments the address into ROM controller RC1-7. At the new address, subsequently received pulse data is written into data memory RAM M1-7, as it is selected, and M2-7 deselected. RC1-7 also changes the control into data selector DS1-7 so that reply pulses are directed out of its number 2 output so as to serve as clock pulses into counter C3-7. Counter C3-7 serves as the address counter for RAM M1-7. Second period pulse processing occurs with time-of-arrival data and signature data being loaded into RAM M1-7 until that count representing a maximum range count plus a maximum reply message count is attained (count=1669 when under 10,000 feet agl and 3289 when above). When this occurs, the output of comparator CM4 goes high. This resets latches L2-7 (through gate O3-7) and L3-7. It also serves as a clock into counter C2-7, changing the address into ROM RC1-7, and resets counters C3-7 and C4-7. With this new address into RC1-7, the decoder is configured to process the acquired data. Both RAMs M1-7 and M2-7 are placed in their read modes, and both are selected. Processing is timed by the output of divider D1 which provides a clock slow enough to allow for all ripple time delays occurring in reply data processing. In this example, the system's clock is divided by 4 which increases the processing period by a factor of four.

At this time, the first data out of both RAMs connect to other units (FIG. 7B) for pulse-pair matching. Here, second reply pulses are matched with a first reply pulse that has a minimum signature difference in a manner like that described for the interrogation message decoder (FIG. 5). The signature information of both first reply pulses and second reply pulses are broken down into their two components—strength and phase count. The signal strength count of a 'first' reply pulse is compared with that of a 'second' reply pulse in subtractor D1-7. The phase count difference of each is compared in subtractor D2-7. The difference out of each subtractor are inputs to an adder unit ADR2-7, and its output is a 'signature difference' count.

The time-of-arrival information of RAM M2-7 (first reply pulse time) connects to the B data input of subtractor D3-7. The time-of-arrival data out of M1-7 (second reply pulse time) connects to the data input of register R1-7. The signature difference between the two data sets first compared appears as the output of adder ADR2-7 and connects to the inputs of comparator CM5-7 (A) and register R2-7. The Q output of register R2-7 connects to the second (B) input to comparator CM5-7. Whenever the A input to CM5-7 is less than the B input, CM5-7's output goes high, serving as a clock into registers R1-7 and R2-7. This always provides a lower signature count into the B input of CM5-7, and loads that pulse's time-of-arrival information io register R1-7.

The signal out of divider D-7 (FIG. 7A) provide a relatively slow clock into counter C3-7. C3-7's output is the address of RAM M1-7. With each clock pulse, new data appears at the output of M1-7, and its signature is compared with that of the data out of M2-7 in subtractors D1-7 and D2-7. Whenever the resultant signature difference out of adder ADR2-7 is less than the value stored in register R2-7, the new lower difference results in a high out of CM5-7 which serves as a clock into registers R1-7 and R2-7. Thus, in succession, each address of RAM M1-7 is accessed, and at each the contents are processed by D1-7, D2-7, ADR2-7, CM5-7, R1-7, and R2-7. When a full address count of M1-7 has been completed, the time-of-arrival data associated with that second reply pulse having a 'signature' most closely matching that of the first reply pulse will have been stored in register R1-7 and loaded into subtractor D3-7. The output of D3-7 will be the time-of-arrival difference between the first pulse and the selected second pulse, and consists of the reply's message. The nine least significant bits represent the message's altitude information and the sender's aircraft (station) type. The four most significant bits contain the address encoded. These 4 bits connect to the B inputs of comparator CM6-7. The A inputs are the interrogator's address. If there is an address match, the reply message is considered to be one intended for the interrogator. The output of CM6-7 goes high and, through AND gate A7-7, serves as a clock signal to load the reply data into buffer register R3-7. The contents of R3-7 are then made available to the systems data computer. This same clock signal is applied to register R4-7 which serves to store each reply's first pulse time count which is a measure of range.

A full cycle zero count out of address counter C3-7 provides a clock signal, through data selector DS2-7, into address counter C4-7. This changes the address into RAM M2-7, making the next first reply pulse available for comparison with the set of second pulses. As described above, the signature of this next first reply pulse is compared sequentially with all of the signature counts of the second reply pulse set and, at the end of the comparison cycle, that second reply pulse having a signature most nearly like that of the first reply pulse will have its time-of-arrival information loaded into register R1-7 and into subtractor D3-7. This processing is non-clocked and the period of the processing clock signal out of divider D7 is chosen to be longer than the ripple time associated with this comparison process. One at a time, in a like manner, all information of 'first' reply pulses in RAM M2-7 is processed to provide a matching second pulse and the encoded intelligence recovered.

Once address counter C4-7 has been clocked a full cycle, its zero output serves as a ROM address counter C2-7 clock signal through OR gate O4-7, placing the ROM address in a data memory clear position. This makes its Q8 output high. Being high enables the slow clock out of D7 to pass through AND gate A5-7, then through OR gate O5-7, and serve both as an address incrementer for both RAM's and a write-strobe trigger source. The same data processing cycle is repeated, only this time data selector DS1-7 provides zero signature information into the RAM's, and the reset system clock counter C1-7 provides zero time-of-arrival data. Once this cycle is completed, the RAMs will be clear of past data and a next 'zero' out of counter C4-7 will pass through the now enabled AND gate A6-7 and reset counter C2-7, ending the whole data processing cycle.

Worst-case traffic environments would provide up to 63 average replies per epoch to high performance type aircraft. By scaling the RAM size to accommodate 128 data sets, there would be provision for peak reply numbers exceeding 100% of average. This would require that counters C3-7 and C4-7 be 7-bit counters. For the low performance General Aviation types, a maximum average reply number would be about 13 per epoch. Therefore, this class could safely use RAMs having only a 32 data set capability. Here, counters C3-7 and C4-7 could be 5-bit counters. Processing time for the high performance case when the processing clock is one fourth that of the system clock (3.75 MHz) would take only 4.5 milliseconds.

Intent Message Generator (FIG. 8)

In the application of an Aircraft Collision-Avoidance System, increased value arises whenever aircraft, sensing a threat situation, convey to others their evasive maneuver intent. By doing this, any two involved in an unsafe situation can be sure of making complementary maneuvers enabling collision avoidance with a minimum of acceleration or deviation from course. FIG. 8 is a block diagram of one way to implement an intent message such that the intent message consists of a pair of pulses that follow the normal second pulse part of a reply message. So that the intent message differs from an interrogation message pair, the spacing between the pair identifying an intent message will be given as 3 clock periods for this example.

An intent message is to be transmitted only when a station's data computer detects a threat on some consecutive number of epochs. For example, this could be on three consecutive data sampling periods. Once a threat is thus verified, the data computer sends an enabling signal to an intent message generator and advises the station operator (flight crew member). The data computer would also generate an optimum intent directive. The flight crew member then decides whether to comply with a computer-issued evasive-maneuver directive or to initiate a preferred alternative. If an alternative maneuver is to be made, the pilot (station operator) manually selects one of eight maneuvers with a switch position (S1-8). This selection is changed into a 3-bit word by message encoder MS1-8. The output of MS1-8 is one input to a data selector DS1-8. The other input to DS1-8 is the 3-bit word representing the data computer's maneuver selection. The output of DS1-8, being the intent choice, connects to the address input of a 1-of-8 data selector DS2-8. The inputs to DFS2-8 are the parallel outputs of an 8-stage shift register SR1-8.

Once the computer has issued an intent message enable (one input to AND gate A1-8), and the pilot has provided an intent message (Manual or Automatic position of switch S2-8) and authorized its transmission via switch S3-8 (set latch L1-8 to its set state), and a reply second pulse is generated (third input to AND gate A1-8), a serial-in pulse is fed into shift register SR1-8 and is shifted through SR1-8 by subsequent system clock pulses. Once the data pulse appears at an output of the shift register that has been selected by data selector DS2-8, it is fed into one input to OR gate O1-8 where it serves as the first pulse of the intent pair. It also connects to the data (D) input of shift register R1-8. Three clock pulses later, this pulse shows up at the output of register R3-8 where it connects to the other input to OR gate O1-8. It becomes the second pulse of the intent pair. The output of OR gate O1-8 connects to the modulator of the station's signal transmitter. Thus, an intent pair is generated with the spacing of its first pulse being the designated intent count after a second pulse of a reply pair. Where this example provides for a choice of up to 8 different maneuvers, implementation could be extended for adding others. Once the data computer senses safe conditions for a preselected number of consecutive data-sampling periods, it issues an intent message reset to latch L1-8 through OR gate O1-8. A Manual Reset input to OR gate O1-8 provides the pilot with the means to discontinue intent message generation at any time.

Intent Message Decoder (FIG. 9)

Intent messages are to be transmitted only by aircraft (stations) that have detected a threat situation. Further, they are to be transmitted only as replies to those interrogators whose altitude is close to that of the threatened aircraft. The intent message is meaningful only to that aircraft (station) that is involved in the threat. That aircraft (station) should also have detected a threat, as it is a party to one. Therefore, as an aircraft would transmit an intent message only after detecting a threat, it would look for an intent message only when a threat appears to exist. By providing this limitation, there is less chance of making needless maneuvers in response to intent messages meant for someone else.

To detect the intent message, the message-type decoder includes another AND gate connected to be responsive whenever two pulses are detected as being (for this example) 3 clock periods apart. In this example it is to be understood that the intent messages are some number of pre-determined maneuvers. For example they could include the intent to turn left, turn right, descend, climb, level of, climb and turn left, climb and turn right, and any other deemed to be needed. Each of these could be given an assigned number. For this example, there shall be a total of 8 possible maneuvers numbered 1 through 8.

To recover intent messages, one needs only to detect a pair of pulses with the proper spacing that follow the second pulse of any reply message pair by a clock count that is less than eight. An easy means to do this and at the same time recover the count is to have a 4-bit counter continually being clocked by the system clock (in this example it would be at a frequency of 15 MHz). Any time a second reply pulse was detected, that pulse would be used to reset the 4-bit counter to zero, and set a latch. Should an "intent" message be detected before a count of 8 elapsed and the detecting aircraft be in a threat situation, the intent message would load the counter's count into a register in the aircraft's data computer. The count would directly be the intent message. If, however, the counter attained a count greater than 8 before any intent message were detected, the 4th bit going high would reset the intent-enabling latch. FIG. 9 is a block diagram showing the intent message decoder circuitry in block diagram form. Its operation is described as follows.

Once a threat is detected, the system's data computer generates a range window bracketing the time that a reply from a threatening aircraft would be expected. This signal is one input to an AND gate A1-9. The system clock at 15 MHz is continually clocking counter C1-9, and is also one input to AND gate A6-9 through inverter I1-9. Whenever a second reply pulse is detected, the output of AND gate A2-9 goes high, resetting counter C1-9. This high also provides an input to AND gate A1-9. When both inputs to AND gate A1-9 are high, denoting a second reply pulse occurring when a reply from a threat station arrived, the output of AND gate A1-9 sets latch L1-9. In its set state, latch L1-9 enables the subsequent count out of counter C1-9 to connect to the data input of register R1-9 via AND gates A3-9, A4-9 and A5-9. When an intent message is detected, it provides one high input to AND gate A6-9. When the current clock signal goes low, the output of inverter I1-9 goes high, causing the output of AND gate A6-9 to go high and clocking the clock count data into register R1-9. The output of register R1-9 is the decoded intent message count. This signal would then be used by the system's data computer 30 (FIG. 1) in determining an optimized response to the threat. Inverters I2-9 and I3-9 provide a delayed clock signal to the system's computer as an intent message strobe.

Since the probability of a non-threat reply occurring during a threat range window time would always be very low, there would be no need to identify a threat signal source by its "signature". Also, no decoded intent message would be considered valid by the system's data computer until several like intent messages were decoded on consecutive data-sampling periods.

While the operation of the system and of the individual circuitry segments making up the data processor 10 have been described in fairly complete detail in connection with the description of FIGS. 1–9, it may be helpful to consider particular waveform patterns and timing relationships which are shown in accompanying FIGS. 10 and 11. FIG. 10 shows a waveform A representing an interrogation message together with a pair of waveforms B and C representing two different reply messages (one with and one without an intent message) in conjunction with a system clock pulse signal, nominally set at 15 MHz (waveform D).

The pulses shown in the message waveforms represent transmitter-on time and are equal in length to one clock pulse cycle, nominally 67 nanoseconds at 15 MHz. In each of the respective messages represented in FIG. 10, the message conveyed in represented by the time duration of the interval between the beginning of the start pulse and the beginning of the termination pulse of a particular waveform. In the case of the interrogation message waveform A, which uses pulse pairs to distinguish from reply messages, the interrogation message is conveyed by the time interval between the beginning of the first pulse in the start pair and the beginning of the first pulse in the termination pair. So that these pairs may be distinguished from each other, the time separation between the pulses of the termination pair is different from the separation between the pulses of the start pair, the spacing being double that of the start pair. Similarly, so that the intent message pulses, being tacked onto the reply message in waveform C, will not be confused with any other pulse pair, the spacing of the intent pair is different from either the start or termination pair of the interrogation message, being three clock cycles rather than two or four.

An interrogation message contains altitude and aircraft type information (altitude being used herein as that altitude which will be reached by the aircraft at a preselected time in the future). Altitude information is specified by a particular count ranging from 0 to 511 unit times (one unit time being 67 nanoseconds in the example shown), each unit time representing a 100-foot increment starting from 1000 feet below sea level for a zero altitude count. Aircraft type is one of the numbers from 0 to 3, represented by that number of 512-unit-time blocks. Thus, the time duration of the interrogation message can range from a minimum of 34.2 microseconds to a maximum of 171.0 microseconds. Actual transmitter-on time will only be 0.2667 microseconds, less than 1% of the minimum length message.

A reply message (waveform B) or the reply portion of waveform C, contains information as to the aircraft type of the responder, its future differential altitude relative to the future altitude of the interrogator, and the address of the interrogator, the address being the least four significant digits of the altitude specified in the interrogation message which is being replied to. The future differential altitude may be represented by from 0 to 127 unit times. Aircraft type is represented by a time duration equal to from 0 to 3 128-unit-time blocks and the address is expressed by a time duration equal to from 0 to 15 512-unit-time blocks. Thus, the reply message (waveform B) has a duration in the range from a minimum of 0 microseconds to a maximum of 546.1 microseconds. However, the spacing between the first and second pulses of a reply message also includes that time representative of a maximum range. For the case of aircraft flying at altitudes under 10,000 feet, a maximum closing speed between two aircraft may be 500 knots. A 45-second range at this speed would be 6.25 nautical miles. The round trip time for a radio signal to travel this distance is 77 microseconds. Thus, the overall reply message time will range from 77 microseconds to 623.1 microseconds.

The intent message of waveform C will have a duration corresponding to a selected number from 1 to 8 of a predetermined multiple of clock pulse cycles added onto the reply message length.

A received message, whether interrogation or reply, is prepared for decoding by first loading the total unit time count into a register. The output of the register then provides a count of the number of unit times represented by the message. This count is decoded, in effect, by first dividing by 512 to determine the number of 512-unit-time blocks contained therein. If the message is an interrogation message (waveform A), the integer part of the resulting quotient signifies aircraft type and the remainder represents the altitude. If the message is a reply message (waveform B), the integer part of the resulting quotient signifies address. The remainder is then divided by 128 to arrive at an indication of aircraft type. In either case, further division by unit time duration (67 nanoseconds) yields a designation of future altitude (0 to 511) for an interrogation message or future differential attitude (0 to 127) for a reply message.

In a practical design, division in the manner described above is not needed when all parameters are scaled in units that are powers of 2. For example, the interrogation message is an 11-bit message (2 to the 11th power). With a received interrogation message is loaded into an 11-bit register, the least significant 9-bits out of the register would connect to that part of a data computer using the altitude information. The most significant 2-bits would connect directly to that part of the data computer using the interrogator-type information providing interrogator aircraft (station) type without any division.

FIG. 11 depicts waveforms E, F and G to show the manner in which phase relationships of received pulses are determined relative to the cycle of the system clock signal on board the receiving aircraft. Waveform E of FIG. 11 represents a received pulse 120 and shows the rounded corners and non-zero rise and fall times which are normally present in pulses of limited bandwidth. Waveform E is shown applied to a threshold level 122 which is used to determine the timing and existence of a pulse such as 120.

Waveform F represents a number of pulses from a phase clock operating at some multiple of the system clock pulse repetition rate. In this example, the phase clock operates at 240 MHz, a 16-times multiple of the 15 MHz system clock signal which is depicted in waveform G.

Once the system detects the presence of a received pulse 120 by the pulse exceeding the threshold 122, a counter begins counting the pulses 124 from the phase clock signal (waveform F) until the next system clock pulse 126 (waveform G) occurs. This phase count, which in the example shown is 14, is then stored and is used to assist in identifying other pulses which are part of the same received message as the particular pulse 120 of depicted waveform E in FIG. 11. This detected phase count becmes part of the signature for a given received pulse.

Systems in accordance with the present invention as shown and described hereinabove provide a very effective communication system for accommodating randomly generated messages of a particular type which must occupy the same transmission medium. While not limited to use with aircraft, the present invention is particularly useful in such an area, and the example which is disclosed is adapted to use of the invention for aircraft collision avoidance. Collision avoidance systems utilizing the present invention give promise of effectively and successfully accommodating many aircraft in the same general geographical area, such as in the vicinity of an airport with good inter-aircraft link reliability, where other systems proposed for the same purpose have been rejected. A system such as is herein disclosed gives promise of meeting the needs and traffic densities projected for traffic at the busiest airports well into the next century, and the system is capable of refinement, where necessary, by extending the concepts of the present system beyond that point.

A key feature of this invention is its capability of generating almost any desired message as a measurable period of transmitted silence. This permits minimizing a transmitter's on-time which thereby minimizes both spectrum usage time and that aircraft's (station's) receiver blockage time, which is that period of time in which a receiver is effectively disabled by the transmitter's power. (One can't talk and listen at the same time.)

Although there have been described above specific arrangements of an aircraft collision avoidance system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An aircraft collision avoidance system in which a plurality of aircraft are equipped with radio communication systems, each such communication system comprising:
   message receiving and transmitting means;

data processing means coupled to the transmitting means for generating plural-data-content interrogation messages in accordance with a first selected format and for generating reply messages in accordance with a second selected format;

said data processing means further including means for decoding a received interrogation message according to said first format and means for initiating generation of a reply message thereto in said second format if and only if the data decoded from said received interrogation message indicates proximity of the interrogating aircraft to the receiving aircraft within preselected limits;

wherein said first and second formats comprise brief initiation and termination pulses spaced apart by a time duration of silence corresponding to the data content of the message.

2. The system of claim 1 wherein the position of the termination pulse is variable, relative to the position of the initiation pulse, in accordance with the data to be conveyed in the message.

3. The system of claim 1 wherein the interrogation message includes a first pair of pulses to initiate the message and a second pair of pulses to terminate the message to distinguish the interrogation message from a reply message which contains only a single initiation pulse and a single termination pulse.

4. The system of claim 3 wherein the second pair of pulses terminating the interrogation message is spaced differently from the first pair of pulses initiating the interrogation message in order to provide a unique identification for the respective initiation and termination pulses.

5. The system of claim 4 wherein a reply message may have tacked onto it an optional intent message which terminates with a pair of pulses which are spaced differently from either pair of pulses in an interrogation message, the time duration of the optional part between the termination pulse of the reply message and the first pulse of said termination pair of the intent message being equal to some multiple of a reference time interval according to an intended evasive maneuver of the replying aircraft in a threat situation.

6. The system of claim 1 wherein the data processing means includes means for generating a sysem clock signal and wherein each of the first and second message formats includes a plurality of portions corresponding respectively to different types of data within a message, the duration of a first one of said portions being measured in multiples of unit times up to a predetermined maximum number defining the block, where a unit time is equal to the period of said clock signal, and the duration of a second one of said portions being measured in multiples of said blocks up to a predetermined maximum.

7. The system of claim 6 wherein the second message format further includes a third portion which is measured in multiples of a sub-block, said sub-block having a duration equal to some multiple of unit times which is less than the number of unit times in a block.

8. The system of claim 7 further including means for counting the number of unit times in a received message in binary numbers and means for storing the resulting count in a binary register such that the count of a first portion of the register is available as a direct indication of one type of received data and the count of another portion of the register is available as a direct indication of another type of received data.

9. The system of claim 1 wherein each of the first and second message formats includes a first portion equal to a number of unit times corresponding to the value of a first type of data to be transmitted, said number of unit times being within a range assigned for the transmission of the first type of data, and a second portion equal to a number of blocks of unit times which corresponds to the value of a second type of data to be transmitted, each of said blocks being equal to the number of unit times defining the upper limit of said first type of data.

10. The system of claim 9 wherein the interrogation message includes data indicating the altitude to be attained by the interrogating aircraft some predetermined time period following transmission of the interrogation message and data indicating the type of interrogating aircraft.

11. The system of claim 10 wherein the altitude data is represented by a time duration equal to a number of unit times which is between zero and a predetermined upper limit and wherein the time duration indicating the type of aircraft is equal to a number of blocks within a range from zero to a predetermined upper limit according to type, a block being equal in time duration to the upper limit of unit times in said altitude range.

12. The system of claim 11 wherein the altitude data is represented by a time duration in the range from 0 to 511 unit times and wherein the type of aircraft is represented by a time duration equal to a number of 512-unit-time blocks in the range from 0 to 3.

13. The system of claim 9 wherein future differential altitude is represented by a time duration equal to a number of unit times between 0 and 127, wherein aircraft type is represented by a time duration equal to a number of 128-unit-time blocks between 0 and 3, and wherein the address of the interrogating aircraft to which the reply message is directed is represented by a time duration equal to a number of 512-unit-time blocks between 0 and 15.

14. The system of claim 13 wherein the address data contained in a reply message corresponds to the least four significant digits in the altitude data portion of the interrogation message which is being replied to.

15. The system of claim 5 having a time reference clock and wherein the data processing means further includes means for generating a signature to identify the pulses of a received message upon detection of an initiation pulse of said message comprising means for storing levels of selected parameters of the detected pulse and means for comparing the levels of the same selected parameters of a subsequently received pulse with the stored levels of a previously received pulse to determine if the pulses are part of the same message.

16. The system of claim 15 wherein one of the selected parameters of a detected pulse is signal strength.

17. The system of claim 16 wherein another selected parameter of a detected pulse is phase of the pulse relative to a timing reference signal.

18. The system of claim 17 further including a phase reference clock operating at some integral multiple of the time reference clock rate and means for storing a count of phase reference clock pulses relative to the period of the time reference clock upon detection of a signal which is part of a received message.

19. A data processor for periodically generating interrogation messages for transmission over a common medium which is shared by messages from other sources and for generating reply messages to received interrogation messages, the data processor comprising:

means for generating interrogation messages having a first start pulse configuration and a first termination pulse configuration which are capable of identifying interrogation messages, the time duration between the first start and termination pulse configurations establishing the information content of the message;

means for generating a replay message having a second start pulse configuration and a second termination pulse configuration in reply to a received interrogation message, said second configurations being capable of identifying reply messages, the time duration between the second start and termination pulse configurations establishing the information content of the reply message;

means for determining the type of received message;

means for decoding the respective types of received message to determine the information content thereof; and means for initiating the generation of a reply message upon the decoding of a received interrogation message.

20. The data processor of claim 19 wherein the message generating means include means for modulating the time duration of the message in accordance with the magnitudes of a plurality of selected parameters which are to be conveyed in the message such that the message information is conveyed by the time duration of a period of non-transmission between beginning and ending pulses of the message.

21. The data processor of claim 20 further including means for sending messages overlapping in time by transmitting a start pulse of one message in the time interval between the start and termination pulses of another message.

22. The data processor of claim 21 wherein the interrogation message decoding means include means for distinguishing the start pulse pair and the termination pulse pair of a received interrogation message.

23. The data processor of claim 22 wherein the interrogation message decoding means include means for separately storing the start pulse pairs of received interrogation messages and means for matching the termination pulse pairs with the corresponding start pulse pairs of respective received interrogation messages so that a plurality of overlapping received interrogation messages may be decoded.

24. The data processor of claim 23 wherein the interrogation message decoding means further include means for concurrently decoding the message content of a plurality of interrogation messages which are received concurrently with overlapping time intervals.

25. The data processor of claim 19 for use in an aircraft collision avoidance system wherein altitude information is conveyed as part of the content of transmitted messages, the altitude information of an interrogation message being the altitude to be attained by the interrogating aircraft at a preselected future time.

26. The data processor of claim 25 wherein the altitude information conveyed in a reply message represents the difference between the altitude which will be attained by the responding aircraft at a preselected future time and the future attained altitude of the interrogation message being replied to.

27. The data processor of claim 26 wherein interrogation messages include data corresponding to future altitude and aircraft type of the interrogating aircraft, the two types of data being represented by time intervals which are added together to form the interrogation message represented between the start and termination pulse pairs of the message.

28. The data processor of claim 27 wherein an interrogation message from a ground station is designated by a predetermined one of the available aircraft type assignments in the aircraft type portion of the message.

29. The data processor of claim 28 wherein the reply message generator is only responsive to interrogation messages from aircraft within a predetermined altitude range of the responding aircraft.

30. The method of generating a message for transmission via a shared medium comprising:
generating a start pulse to indicate the beginning of the message;
generating a termination pulse to indicate the end of the message; and
controlling the spacing between the start pulse and the termination pulse in accordance with the information content of the message.

31. The method of claim 30 wherein the message comprises a plurality of different types of data, the data within a given type being variable within a predetermined range.

32. The method of claim 31 wherein the data of one type is represented by a number of unit times duration within a first range, and wherein the data of another type is represented by a number of unit time blocks duration within a second range, each block being a multiple of unit times equal to the upper limit of the number of unit times in the first range.

33. The method of claim 32 wherein a portion of the message is represented by numbers of unit time blocks within a third range, each such block being a number of unit times which is a sub-multiple of the unit times in the blocks of the second range.

34. The method of claim 30 further including the steps of generating messages of different types and distinguishing the different types of messages by varying the numbers of start and termination pulses.

35. The method of claim 34 including generating an interrogation message by placing a pair of start pulses at the beginning of the message, which pulses are separated by a first interval, and placing a pair of termination pulses at the end of the message, the termination pulses being separated by a second interval which is a selected multiple of the first interval.

36. The method of claim 35 wherein the message is a reply to an interrogation message and is followed by an intent message which is terminated by a pair of pulses separated by a third interval, the third interval being a selected multiple of the first interval which is different from the second interval to assure discrimination between the types of messages.

37. The method of processing messages generated in accordance with the method of claim 30 comprising:
identifying a received pulse as the start of a message;
beginning a count of unit times upon receipt of said start pulse;
developing a pulse signature from said start pulse on the basis of a plurality of selected parameters;
comparing other received pulses with the signature of said start pulse;
terminating said unit time count upon recognition of a termination pulse having a signature corresponding to that of the start pulse; and
decoding the received message from the time interval between the start and termination pulses.

38. The method of claim 37 further including the steps of identifying the received message as an interrogation message upon receipt of a start pulse pair and identifying the termination of the message upon detection of a termination pulse pair having a signature corresponding to that of the start pulse pair.

39. The data processor of claim 19 wherein the first start and termination pulse configurations each comprise a pair of pulses, and wherein the second start and termination pulse configurations each comprise a single pulse.

* * * * *